US006263405B1

(12) United States Patent
Irie et al.

(10) Patent No.: US 6,263,405 B1
(45) Date of Patent: Jul. 17, 2001

(54) MULTIPROCESSOR SYSTEM

(75) Inventors: Naohiko Irie, Kawasaki; Naoki Hamanaka; Tsuyoshi Tanaka, both of Tokyo; Masabumi Shibata, Kawasaki; Atsushi Nakajima, Hadano, all of (JP)

(73) Assignee: Hitachi, LTD, Tokyo (JP)

( * ) Notice: Subject to any disclaimer, the term of this patent is extended or adjusted under 35 U.S.C. 154(b) by 0 days.

(21) Appl. No.: 09/134,336

(22) Filed: Aug. 14, 1998

(30) Foreign Application Priority Data

Aug. 19, 1997 (JP) .................................................. 9-222231

(51) Int. Cl.[7] ...................................................... G06F 12/12
(52) U.S. Cl. .......................... 711/141; 711/140; 711/144; 711/145; 711/158; 711/168
(58) Field of Search .......................... 711/140–150, 158, 711/168

(56) References Cited

U.S. PATENT DOCUMENTS

| | | | |
|---|---|---|---|
| 5,386,511 | * | 1/1995 | Murata et al. ........................ 711/120 |
| 5,559,987 | * | 9/1996 | Foley et al. .......................... 711/144 |
| 5,581,777 | * | 12/1996 | Kim et al. ............................. 712/16 |
| 5,598,550 | * | 1/1997 | Shen et al. ........................... 711/146 |
| 6,038,644 | * | 3/2000 | Irie et al. ............................. 711/141 |

* cited by examiner

Primary Examiner—Than Nguyen
(74) Attorney, Agent, or Firm—Antonelli, Terry, Stout & Kraus, LLP

(57) ABSTRACT

A cache status report sum up for use in a multiprocessor system having a plurality of processor units each having a processor and a cache memory and a plurality of memory units. The cache status report sum up apparatus sums up cache coherency check results indicating statuses of the cache memories without limiting the number of memory access requests requiring cache coherency checks that can be overlapped when the memory access requests requiring cache coherency checks are executed in an overlapping manner. The cache status report sum up apparatus is provided between the processor units and the memory units and sums up cache coherency check results sent by cache status reporting apparatus included in each processor unit. The cache status reporting apparatus responds to a memory access request requiring a cache coherency check. The cache status report sum up apparatus, after summing up the cache coherency check results, sends the summary of the cache coherency check results to the processor unit which requested the memory access request requiring a cache coherency check.

45 Claims, 15 Drawing Sheets

PROCESSOR BOARD

TRANSACTION SENDING CIRCUIT

TRANSACTION RECEIVING CIRCUIT

SC TRANSACTION FORMAT

CROSSBAR UNIT

PROCESSOR BOARD (MODE 2)

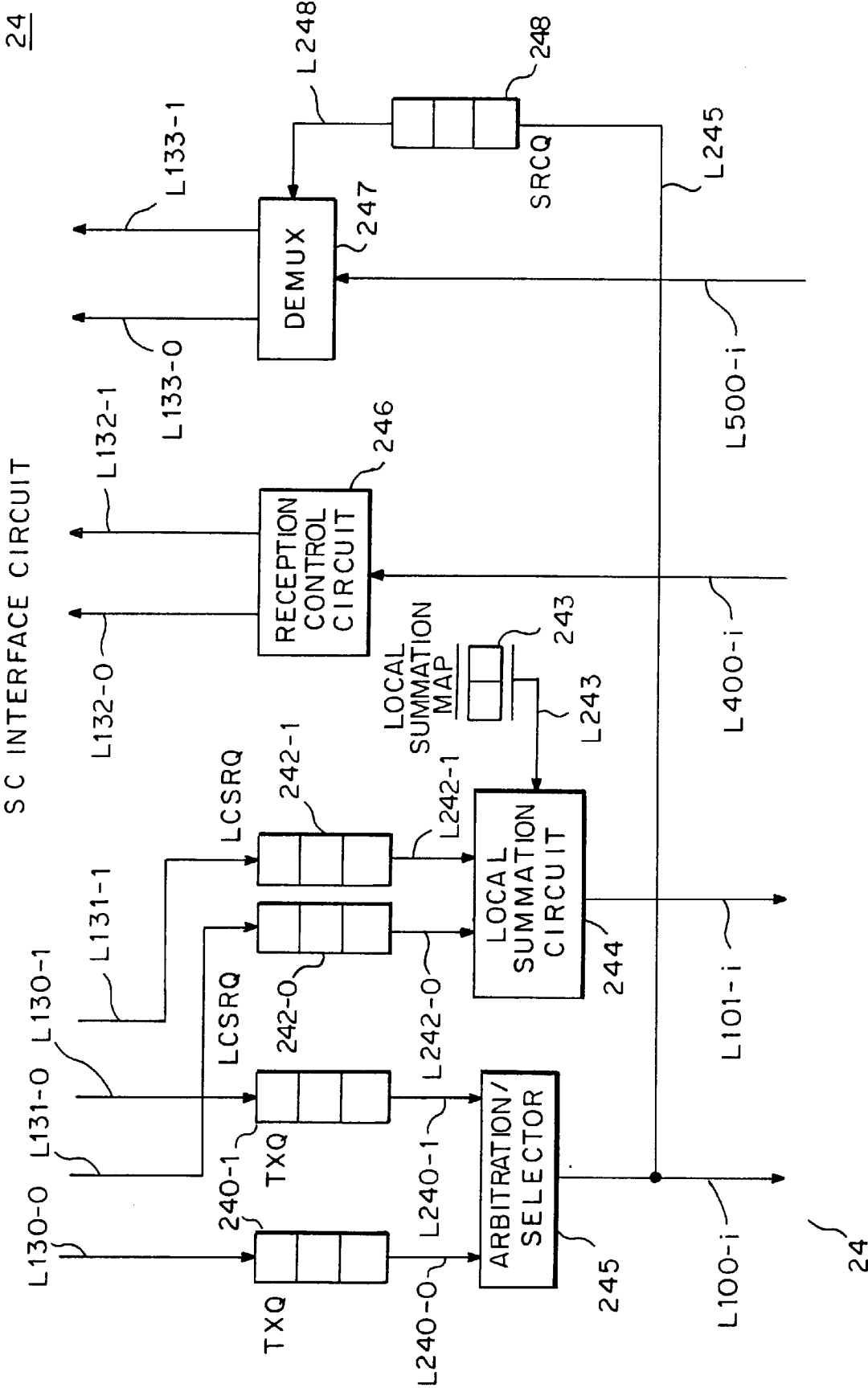

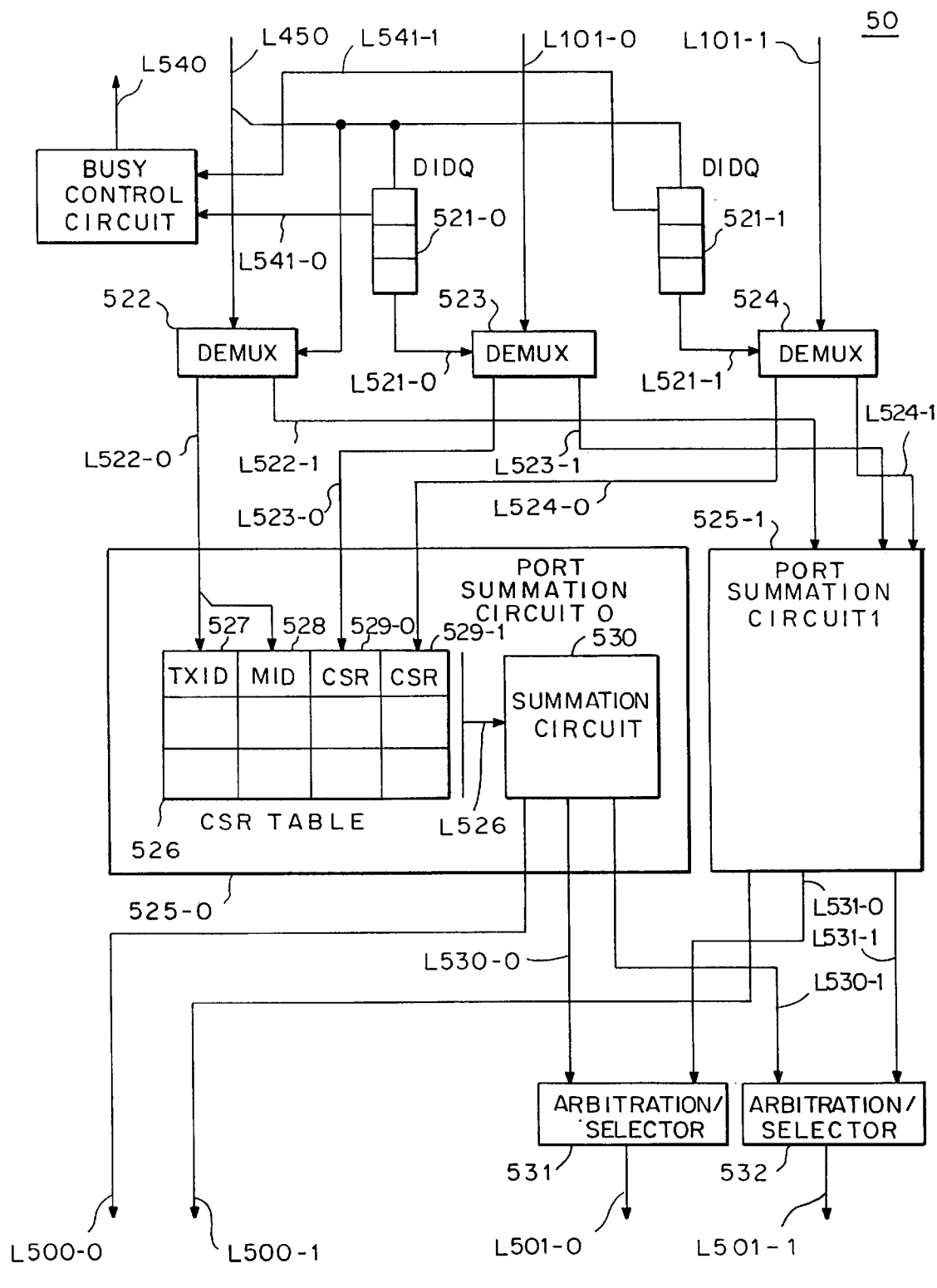

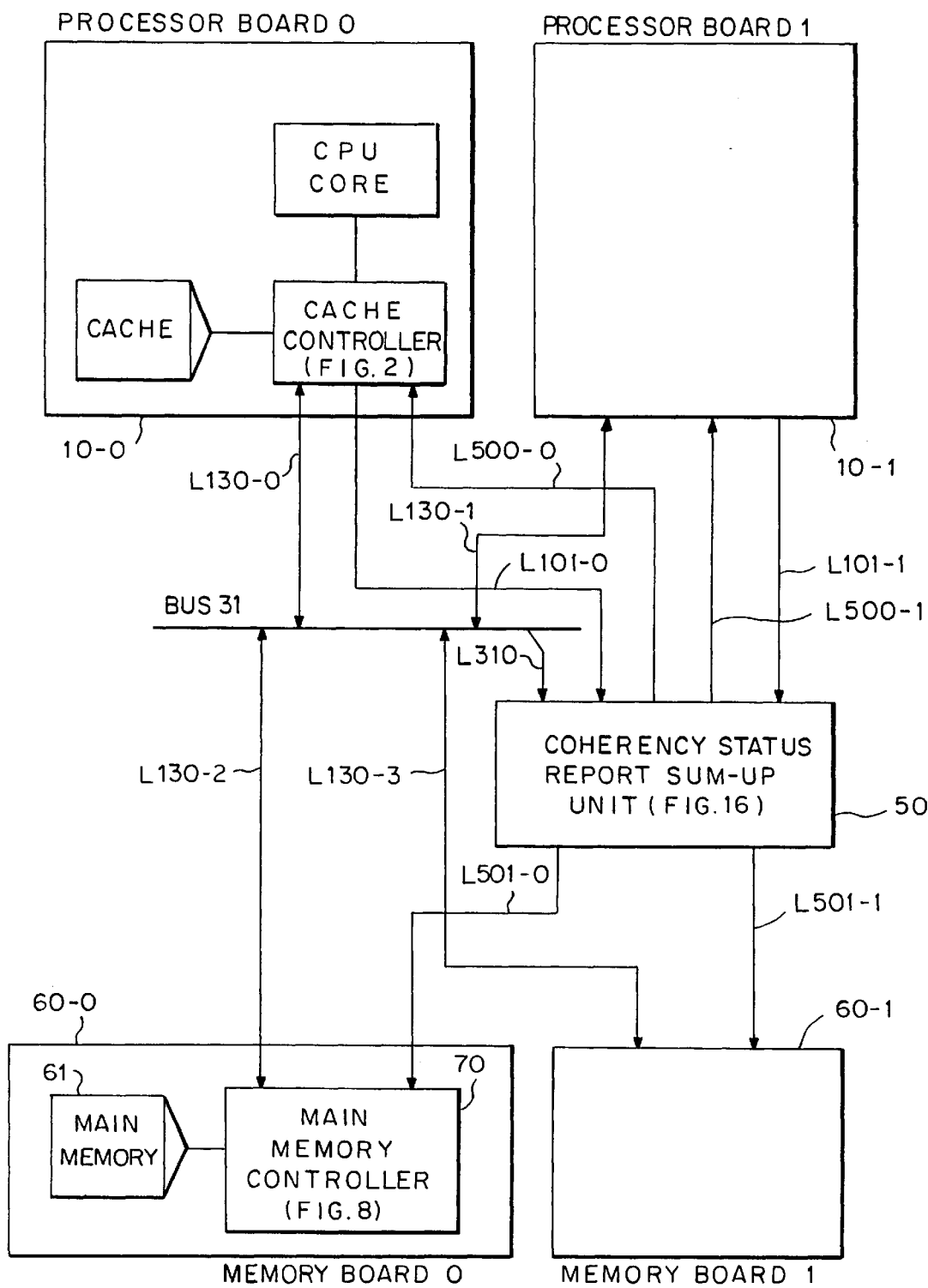

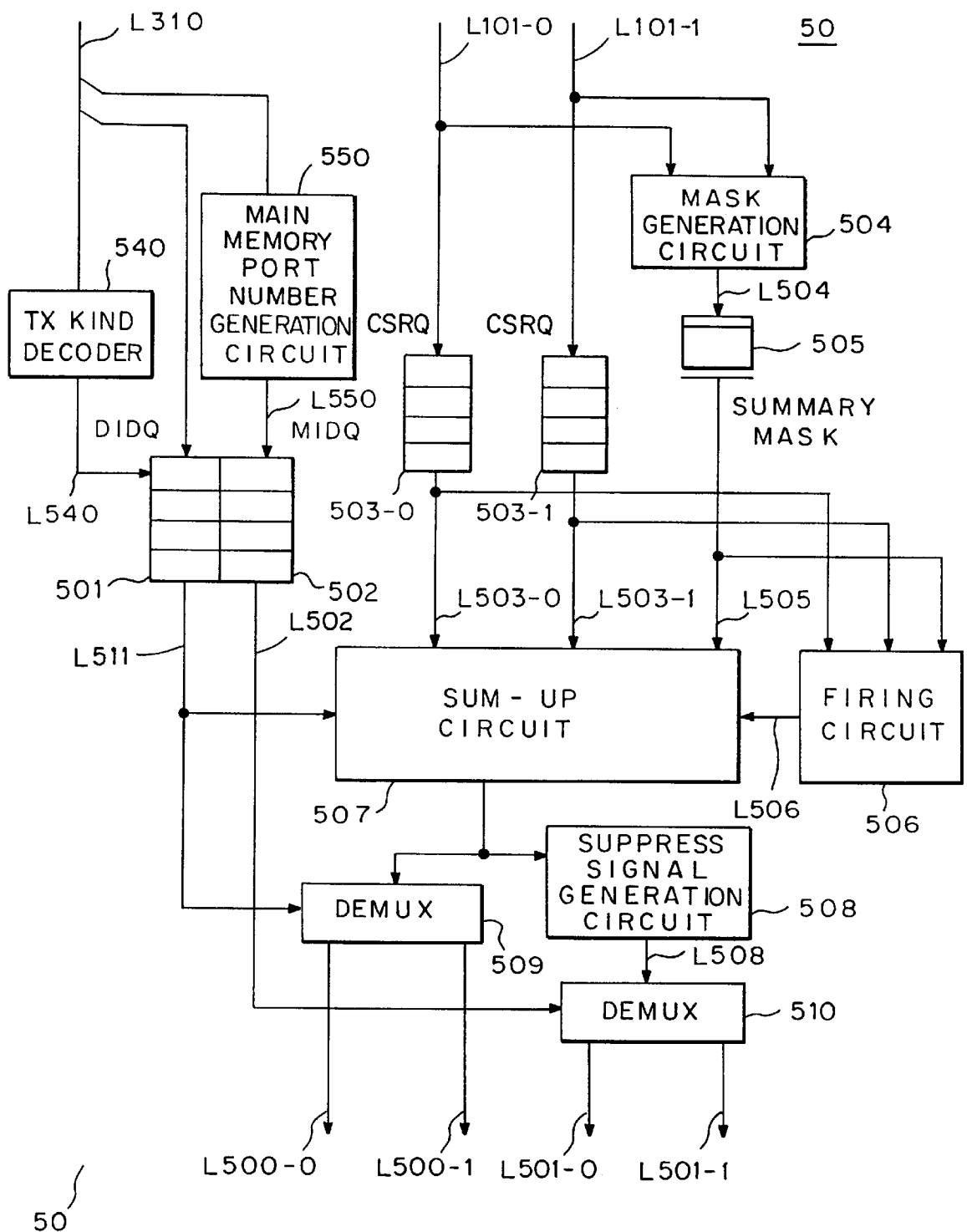

MULTIPROCESSOR SYSTEM

BACKGROUND OF THE INVENTION

The present invention relates to a multiprocessor system. More particularly, the present invention relates to a multiprocessor system in which a plurality of processors are interconnected to a plurality of cache memories by interconnection apparatus which maintains coherency between the cache memories.

Many conventional shared memory multiprocessors have a common configuration in which several processor units and memory units are connected through a bus and which employs a snoop cache scheme to guarantee the coherence among the contents of the caches in the processor units.

Examples of such computer systems can be found in "Ben Catanzaro, Multiprocessor System Architectures, Sun Microsystems, 1994" (referred to as reference literature 1), or "Don Anderson/Tom Shanley, PENTIUM PROCESSOR SYSTEM ARCHITECTURE, Second Edition, MIND-SHARE INC., 1995" (referred to as reference literature 2). In these conventional examples, two or more processor units and memory units are connected by a single bus. The processor units are interconnected by a cache coherency check result bus, which has a shared signal and a dirty signal. The operation flow is as follows. A memory access request that requires checking the status of other caches will be referred to as a coherent read request. The returning by each cache of information concerning the status of the corresponding cache line in response to a coherent read request to the source of the coherent read request will be referred to as a coherency status report.

(1) A processor unit requesting certain data puts a coherent read request on the bus connecting the processor unit and the main memory.

(2) When the processor units find the coherent read request on the bus, they send their replies out on a cache coherency check result bus interconnecting the processor units. Each processor unit, when for example it holds the requested data in a clean state, asserts a shared signal. When it holds the requested data in a dirty state, it asserts a dirty signal. The requesting source checks the shared signal and the dirty signal at predetermined cycles. The predetermined cycles differ from one conventional system to another. In the case of the literature 1, the predetermined cycles are fixed cycles after the coherent read request has been sent on the bus and, in the case of the literature 2, the cycles extend until the data from a memory is returned. If the shared signal is asserted, the requesting source judges that at least one other processor unit shares the data and determines the next state of its own cache accordingly. If the dirty signal is asserted, it judges that at least one other processor unit holds the latest data and determines the next state of its own cache and the data sending source accordingly. This processing of determining the state of its own cache or determining the latest data sending source based on the coherency status reports from a plurality of processor units is referred to as summation of coherency status reports.

(3) The memory unit sends the requested data to the coherent read requesting processor unit.

(3') If one of the processor units has already updated the requested data, the processor unit in place of its memory unit sends the updated data to the coherent read requesting source.

This scheme of summing the status reports from a plurality of processors by using wired logic of the bus will be referred to as a bus summary scheme.

Japanese Patent Laid-Open No. 281956/1995 (referred to as reference literature 3) discloses a coherency status report sum-up scheme for cases where a plurality of coherent read requests are executed simultaneously in an overlapping manner. In this conventional scheme, a plurality of processor units and one memory unit are connected by a single bus and the processor units are each connected with the memory unit by separate coherency status report lines. The operation flow during the coherent read is as follows:

(1) A processor unit requesting certain data sends a coherent read request out on a bus connecting the processor units and the memory unit.

(2) Each processor sends its coherency status report to the memory unit through the coherency status report line. The memory unit sums up the coherency status reports sent from the processors to determine the next state of the cache of the coherent read requesting source.

(3) The memory unit sends the requested data to the coherent read requesting processor unit. At the same time, the memory unit reports the next state of the cache to the coherent read requesting processor unit through the status report line provided on the bus.

(3') If any of the processors has already updated the requested data, that processor unit instead of the main memory sends the updated data to the coherent read requesting processor unit.

The above-described scheme will be referred to as a unit centralized summary scheme.

In realizing the snoop cache scheme, in the case of the above conventional example, it is assumed that the coherent read request is distributed through the bus connecting the processor units and the memory unit. Although this apparatus is effective in connecting a small number of processors at low cost, the bus traffic increases as the number of processor units or the main memory units increases, making the performance enhancement difficult. When building a large-scale multiprocessor system, the number of units to be driven increases and the physical size becomes large, rendering the operating frequency difficult to improve. To deal with this problem, Japanese Patent Laid-Open No. 138782/1997 (referred to as literature 4) discloses a method of performing snoop by using, instead of a bus, an interconnection network that can transfer addresses and data parallelly. Specifically, a crossbar network. This conventional example, though it discloses the method of distributing the coherent read request, does not describe the method of sending a coherency status report and the method of summing the cache coherency check results.

Of the above conventional examples, the bus summary scheme has difficulty improving the operation frequency because the coherency status report are sent through the bus. In systems where multiple coherent read requests are executed simultaneously in an overlapping manner, the next cache coherency check result cannot be sent out until the summary of cache coherency check results is completed, limiting the number of coherent read requests that can be overlapped. The unit centralized summary scheme cannot be applied to cases where there are a plurality of main memory units or where a plurality of main memory control units are employed to enhance the throughput.

Further, none of the above-described conventional systems can be applied to the snoop scheme using an interconnection network such as the crossbar network described above.

SUMMARY OF THE INVENTION

An object of the present invention is to provide apparatus that allows for the summing up of the cache coherency check results of cache memories without limiting the number of memory access requests requiring cache coherency checks that can be performed in an overlapped manner or at the same time.

Another object of the present invention is to reduce the number of pins between the processor units and the apparatus that sums up the cache coherency check results.

To achieve the above-described objects the present invention provides an interconnection apparatus that transfers cache coherency check results among a plurality of processor units. The interconnection apparatus sums up the cache coherency check results from all the processor units and sends a summary of the results to the processor unit which requested a memory access requiring the cache coherency check.

Further, the present invention provides apparatus which allows, when issuing a memory access request requiring a cache coherency check, a cache coherency status report sum up circuit to obtain information necessary for summing the cache coherency check results from the interconnection apparatus connecting the processors and the memory units.

More particularly the present invention provides a multiprocessor system which includes a plurality of processor units each having a processor and a cache memory, a plurality of memory units shared by the processor units, and an interconnection apparatus which interconnects the processor units and the memory units. The interconnection apparatus retrieves information on the status of each of the cache memories in response to a memory access request requiring a cache coherency check from a processor unit, sums up the information on the status of each of the cache memories and reports the summed up information to the processor unit which issued the memory access request requiring the cache coherency check.

Each processor unit includes a cache status reporting circuit which in response to a coherent read request issued by the interconnection apparatus based on the memory access request requiring a cache coherency check, sends a cache coherency check result to the interconnection apparatus according to the status of the cache memory. The interconnection apparatus includes a cache status report sum up circuit which sums up the cache coherency check results received from the cache status reporting circuit in each processor unit, and sends the summed up cache coherency check results to the processor unit which issued the memory access request requiring the cache coherency check. The interconnectin apparatus also includes an interconnecting network connected to the processor units and the memory units for exchanging data between the processor units and the memory units.

The interconnection apparatus further includes a register which stores information indicating a processor unit which issued the memory access request requiring the cache coherency check. The interconnection apparatus sends the information generated by the cache status report sum up circuit to the processor unit indicated by the information stored in the register. The interconnection apparatus parallelly processes memory access requests requiring cache coherency checks from the processor units. The interconnection apparatus still further includes a plurality of data lines for exchanging data between the processor units and the memory units, and a plurality of status report lines for reporting information concerning the status of the cache memories to the processor units.

The present invention can be implemented as an interconnection apparatus which can be installed by the user in a multiprocessor system including a plurality of processor units each having a processor and a cache memory, and a plurality of memory units shared by said processor units. The interconnection apparatus includes an interconnection network connected to the processor units and the memory units, for exchanging data between the processor units and the memory units, and a cache status report sum circuit which sums up information indicating a result of a cache coherency check received from each processor unit and sends the summed up cache coherency results to a processor unit which issued the memory access request requiring the cache coherency check.

The present invention can be further implemented as a chip set including a plurality of semiconductor integrated circuit chips for performing cache coherency processings. The chip set can be installed by the user in a multiprocessor system as described above. The chip set includes an interconnection network unit, to be connected to the processor units and the memory units, for exchanging data between the processor units and the memory units, a cache status reporting unit, responsive to a coherent read request issued from the interconnection network unit based on a memory access request requiring a cache coherency check, for sending a cache coherency check result to the interconnection network unit indicating a status of a corresponding cache memory, and a cache status report sum up unit which sums up cache coherency check results received from the cache status reporting unit corresponding to each processor unit, and which sends the summed up cache coherency check results to the processor unit which issued the memory access request requiring the cache coherency check. The chip set also includes a memory controller unit which controls access to a corresponding memory unit based on the memory access request requiring a cache coherency check.

BRIEF DESCRIPTION OF THE DRAWINGS

The scope of the present invention will be apparent from the following detailed description, when taken in conjunction with the accompanying drawings, and such detailed description and specific examples, while indicating preferred embodiments of the invention, are given by way of illustration only, since various changes and modifications within the spirit and scope of the invention will become apparent to those skilled in the art from this detailed description, in which:

FIG. 13 is a block diagram of the SC interface circuit used in the system of FIG. 1;

FIG. 14 is a outline block diagram of the coherency status report sum-up unit used in the system of FIG. 1;

FIG. 15 is a block diagram of the multiprocessor system of the present invention; and FIG. 16 is a block diagram of the coherency status report sum-up unit used in the system of FIG. 15.

DESCRIPTION OF THE EMBODIMENTS OF THE INVENTION

The multiprocessor system of the present invention will be described in detail in conjunction with several modes, referring to the accompanying drawings. In the second and succeeding modes, only the differences from the first mode of the present invention will be described.

1. Configuration of the System

Figure 1:
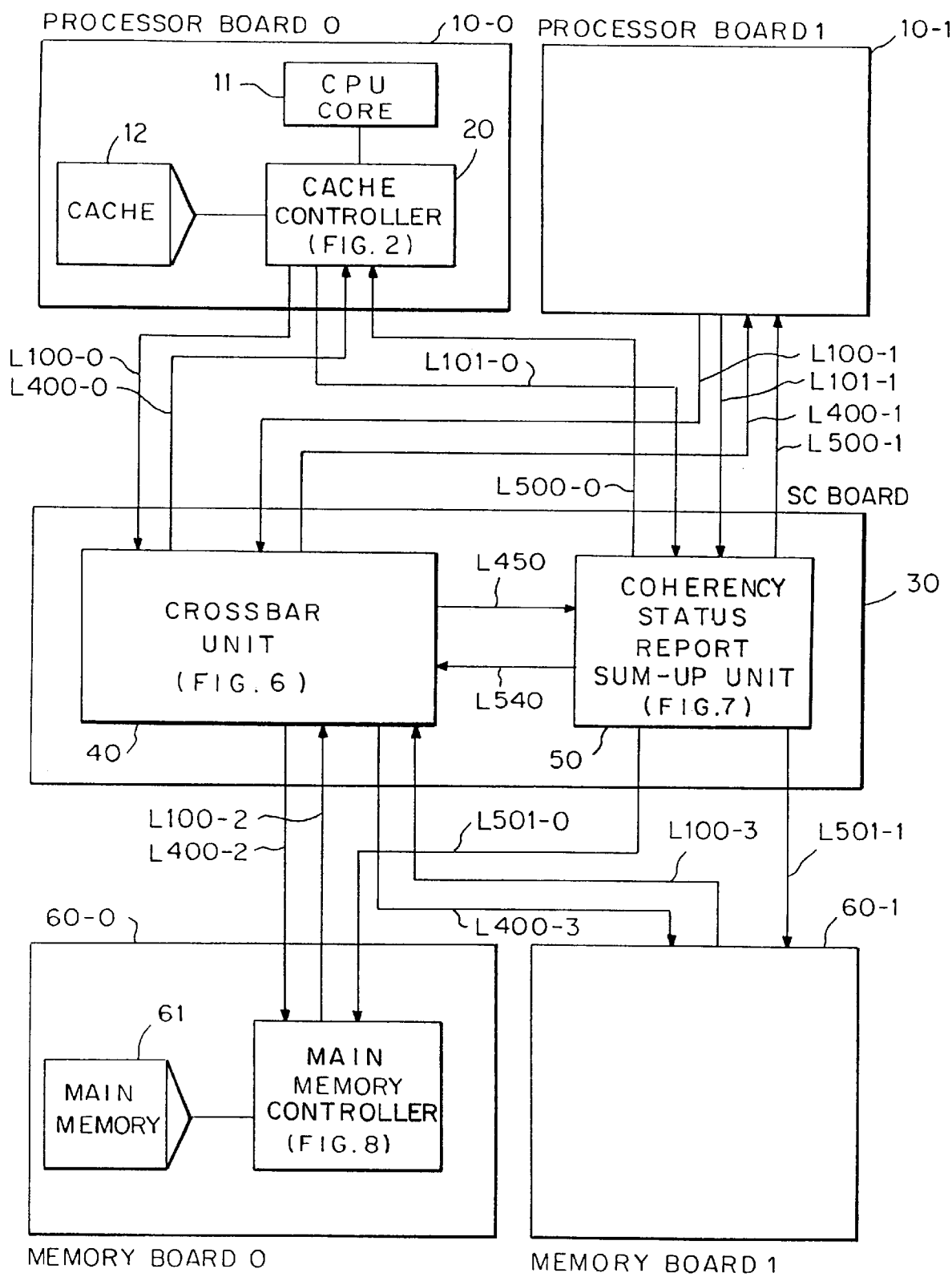
FIG. 1 is an overall block diagram of the multiprocessor system of the present invention.

FIG. 1 illustrates an overall configuration of the multiprocessor system of the present invention, which has two processor boards 10-0, 10-1, two memory boards 60-0, 60-1, a unit including peripheral devices such as input/output devices (not illustrated), and a system connection (SC) board 30 connecting these components. The memory boards 60-0, 60-1 each have a main memory 61 stored with programs and data, and a main memory controller 70. The main memory 61 is connected to the SC board 30 through the main memory controller 70. The two memory boards 60-0, 60-1 are interleaved in units of 64 bytes. The interleave unit is determined by the line size of caches 12 in the processor boards 10-0, 10-1. The processor boards 10-0, 10-1 each include a CPU core 11 that reads program instructions successively from the main memory 61 and executes them, a cache 12 stored with the copy of a part of the main memory 61, and a cache controller 20 for controlling the cache.

Figure 2:
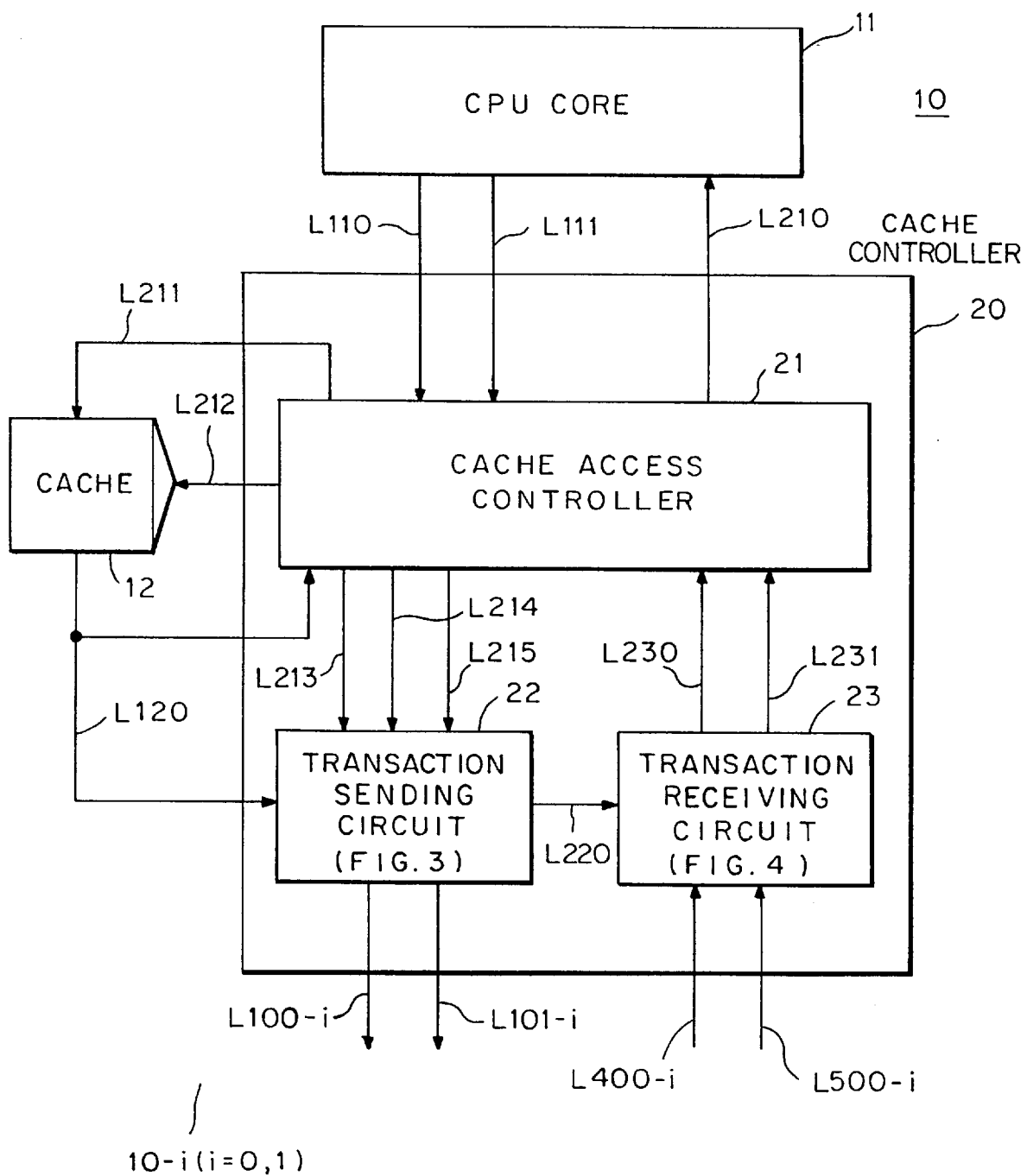
FIG. 2 is a block diagram of the processor board used in the system of FIG. 1.

The cache controller 20 as illustrated in FIG. 2, includes a cache access controller 21 for controlling the access to the cache 12 and is connected through a transaction sending circuit 22 and a transaction receiving circuit 23 to the SC board 30.

The SC board 30 includes a crossbar unit 40 that communicates address and data between the-processor boards 10-0, 10-1 and between the processor boards 10-0, 10-1 and the memory boards 60-0, 60-1, and a coherency status report sum-up unit 50. The crossbar unit 40 and the processor boards 10-0, 10-1 or the memory boards 60-0, 60-1 are connected through 8 byte wide 1-to-1 signal lines L100-0 to -3 and L400-0 to -3.

The coherency status report sum-up unit 50 and the processor boards 10-0, 10-1 are also connected through 1-to-1 signal lines L101-0 to -1, L500-0 to -1. These signal lines L101-0 to -1 and L500-0 to -1 constitute coherency status report lines to be described later and its control lines and are one-way (3 bits+a few control lines). The coherency status report sum-up unit 50 and each of the memory boards 60-0, 60-1 are connected by signal lines L501-0 to-1 that control memory data transfer described later. The crossbar unit 40 and the coherency status report sum-up unit 50 are connected by signal lines L450, L540 that transfer the signals necessary for the summary function. The crossbar unit 40 has a multicast function for snoop. One unit of address and data that pass through the crossbar unit 40 will be referred to as an SC transaction or simply a transaction.

In this mode, a port 0 of the crossbar unit 40 and a port 0 of the coherency status report sum-up unit 50 are connected with the processor board 10-0. Similarly, a port 1 of the crossbar unit 40 and a port 1 of the coherency status report sum-up unit 50 are connected with the processor board 10-1. The memory board 60-0 and the memory board 60-1 are connected to a port 2 and a port 3, respectively, of the crossbar unit 40 and the coherency status report sum-up unit 50.

In the following, the outline of the memory access operation will be described referring to FIGS. 9 and 10, and the detail of each step in this operation flow will be described referring to FIGS. 1 to 9.

2. Outline of Operation

In the following, the outline of the system operation for cases where the cache 12 misses when the CPU core 11 executes a memory load instruction or a store instruction will be described. The operation performed when the cache 12 hits is similar to the one performed by a processor system having a general cache. In this mode, the cache 12 adopts a store-in scheme. The states that the cache line can take are "dirty," "clean," "shared" and "invalid." These are identical with what is generally called the MESI protocol. When a certain cache line indicates a "dirty" or "clean" state, it is guaranteed that this line is not being cached from other caches 12. When a certain cache line exhibits a "clean" or "shared" state, it is guaranteed that the data in this line agrees with the data on the main memory 61. For the transition of each cache line state, refer to, for example, the reference literature 2. This mode, however, differs from the reference literature in that when the cache hits in the "dirty" state in response to the coherent read request from another processor board 10-0 to -1, the processor sets the next state of its own cache 12 to the "invalid" state, not the "shared" state, and does not write back the state in the main memory 61.

The outline of the operation when a cache miss occurs in the processor board 10-0 will be described for cases where the latest data reside in the main memory and for cases where the latest data reside in the cache 12 in the processor board 10-1 referring to FIGS. 9 and 10, respectively.

First, a description will be provided concerning a case where the latest data are present in the main memory. This case will be referred to as operation case 1 referring and illustrated in FIG. 9. In this case, it is assumed that the CPU core 11 in the processor board 10-0 issues a load instruction and the associated data are not present in the caches 12 of the processor board 10-0 and the processor board 10-1.

First, the CPU core 11 in the processor board 10-0 sends a memory load request to the cache access controller 21 (step 901). The cache access controller 21 judges that the cache has missed (step 902) and the transaction send circuit 22 sends a data read transaction as a coherent read request to the crossbar unit 40 (step 903). The crossbar unit 40 multicasts this data read transaction to all the processor boards 10-0 to 10-1 and to a specified memory board 60-0 (step 904). Upon receiving the coherent read request (step 905), the processor boards 10-0 to -1 each checks the state of the internal cache 12 and sends the check result as a coherency status report CSR to the coherency status report sum-up unit 50 (step 906).

The coherency status report sum-up unit 50 makes a summary of the coherency status reports when it receives all the coherency status reports, and sends the coherency status summary CSS to the coherent read requesting processor board 10-0. At the same time, the sum-up unit sends a memory data transfer allowance signal to the memory board 60-0 (step 907). In parallel with the steps 905, 906, the memory board 60-0 that has received the coherent read request accesses the internal main memory 61. When it receives the transfer allowance signal from the coherency status report sum-up unit 50, the memory board sends the retrieved data as a data transaction to the crossbar unit 40 (step 908). The crossbar unit 40 transfers the data transaction to the processor board 10-0 which has issued the coherent read request (step 909). The processor board 10-0, which has received the coherency status summary CSS and the memory data (step 910), registers the data and the status in its cache 12 and returns the data to the CPU core 11 (step 911).

Figure 10:
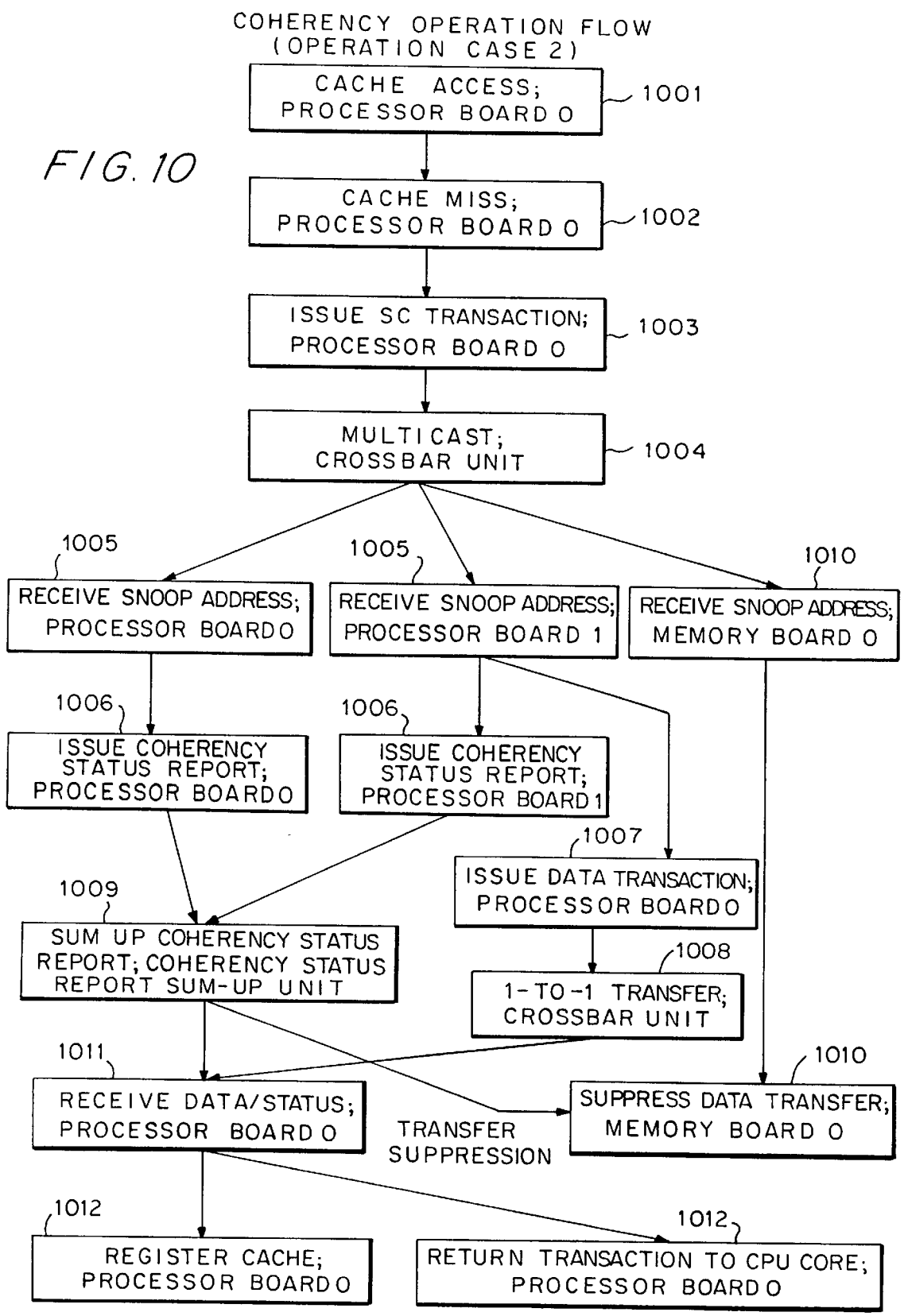
FIG. 10 is a coherency operation flowchart of operation case 2.

Next, referring to FIG. 10, a description will be provided of the operation for the case where the latest data is present in the cache 12 in other processor boards 10-0 to 10-1. This case will be referred to as operation case 2. In this case, it is assumed that the CPU core 11 in the processor board 10-0 issues a store instruction and the associated data resides in the cache 12 of the processor board 10-1 in a "dirty" state.

First, the CPU core 11 of the processor board 10-0 sends a store request to the cache access controller 21 (step 1001). The cache access controller 21 judges that the cache has missed (step 1002) and the transaction sending circuit 22 sends a data read invalidation transaction as the coherent read request to the crossbar unit 40 (step 1003). The crossbar unit 40 multicasts the transaction to all the processor boards 10-0 to -1 and a specified memory board 60-0 (step 1004). The processor board 10-1 that has received the coherent read request (step 1005) checks its internal cache 12 and, when the cache access controller 21 judges that the cache holds the latest data, sends the check result as a coherency status report to the coherency status report sum-up unit 50 (step 1006). The processor board also sends the latest data read out from the cache 12 as a data transaction to the crossbar unit 40 (step 1007). The crossbar unit 40 then sends the data transaction to the processor board 10-0, which has made the coherent read request (step 1008). The operation of steps 1005, 1006 in the processor board 10-0 is similar to that of the operation case 1. The coherency status report sum-up unit 50, when it receives the CSRs from all the processor boards 10-0 to -1, makes a summary of the CSRs and sends the coherency status summary as a CSS to the processor board 10-0. Further, the coherency status report sum-up unit 50, since it judges based on the coherency status summary CSS that the data transfer from the main memory 61 is not necessary, sends a data transfer suppress signal to the memory board 60-0 (step 1009). Because it has received the data transfer suppress signal, the memory board 60-0 that received the coherent read request finishes the processing without sending the data transaction to the crossbar unit 40 (step 1010). The processor board 10-0 that has received the CSS and the data (step 1011) registers the data and the status in the cache 12 and stores the store data from the CPU core 11 (step 1012).

The write-back on the main memory 61 of the data in the cache 12 is performed when the cache line is replaced or by a flush forced by an instruction. As to this operation there is no difference from the conventional apparatus and their associated circuit and description will be omitted.

3. Details of Operation

In the following the operation performed in the event of a cache miss will be described for operation case 1 illustrated in FIG. 9 and for operation case 2 illustrated in FIG. 10. The alphabet in each item number in sentences corresponds to the step marked with a like alphabet. The contents of operation are common for both operation cases unless a particular operation case is specified.

3.1 Cache Access

The operation performed during the cache access will be described referring to FIG. 2. When the instruction being executed in the CPU core 11 is a memory access instruction, that is, a data load instruction or a data store instruction, the CPU core 11 sends the address through the signal line L110 and the access kind and the transaction identifier TXID through the signal line L111 to the cache access controller 21 in the cache controller 20. The access kind refers to the distinction among the instruction load, the data load and the data store.

In operation case 1, the CPU core 11 sends the data load as the access kind to the cache access controller 21 through the signal line L111. In operation case 2, the CPU core 11 sends the data store as the access kind through the signal line L111 to the cache access controller 21.

3.2 Judgement of Cache Miss

The operation performed in the event of cache miss will be described referring to FIG. 2. The cache access controller 21 according to the address received accesses the cache 12 through the signal line L212 to check the status of a cache line. If the cache line corresponding to the specified address does not exist or the status of the cache line is not valid, the cache access controller 21 judges that the cache 12 has missed, and then sends the address through the signal line L214, the transaction kind through the signal line L215, and the transaction identifier TXID and its port number 0 through the signal line L213 to the transaction sending circuit 22. The transaction kind is determined by the access kind sent from the CPU core 11 via the signal line L111. The transaction is an instruction load when the access kind is an instruction load, a data read when the access kind is a data load, and a data read invalidation when the access kind is a data store. The method of checking the cache 12 will not be described here since it is similar to the conventional cache control scheme.

In operation case 1, because the access kind from the CPU core 11 is a data load, the transaction kind is a data read. In operation case 2, because the access kind from the CPU core is a data store, the transaction kind is a data read invalidation.

3.3 Issuing a System Connection Transaction

Figure 3:
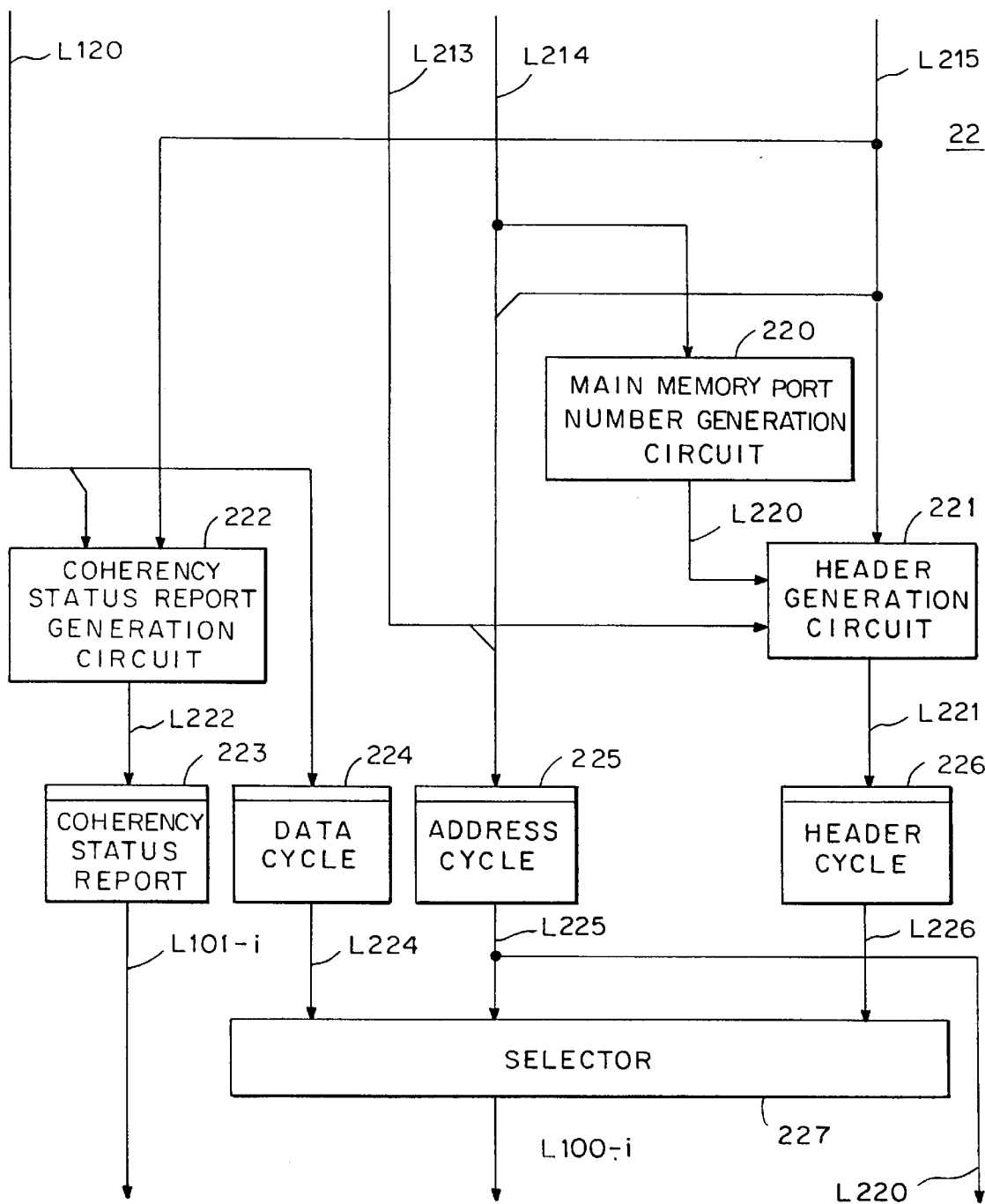
FIG. 3 is a block diagram of the transaction sending circuit used in the apparatus of FIG. 2.
Figure 5:
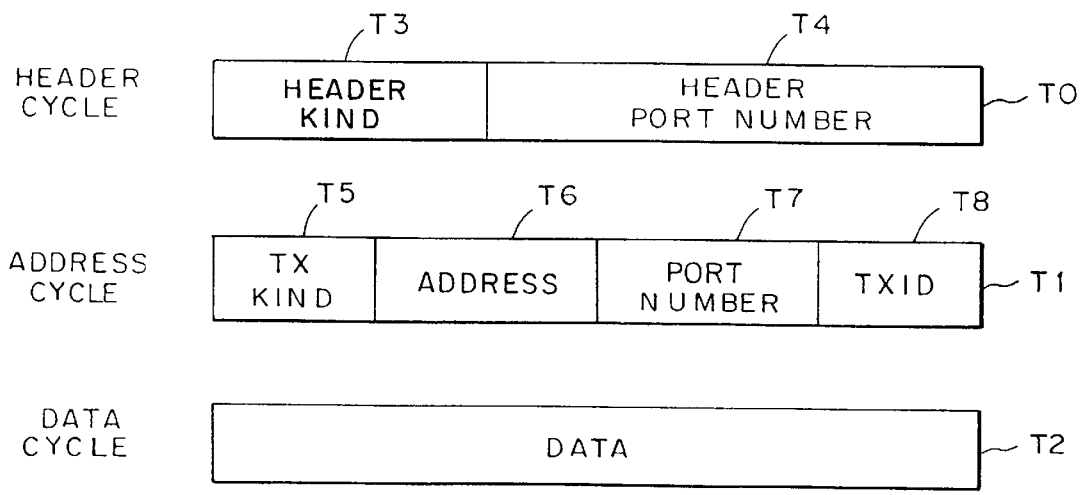
FIG. 5 is a transaction format used in the system of FIG. 1.

The operation of issuing an SC transaction will be described referring to FIGS. 3 and 5. Based on the transaction kind and address sent from the cache access controller 21, the transaction send circuit 22 generates an SC transaction as a coherent read request and issues it to the crossbar unit 40 in the SC board. The format of the SC transaction is illustrated in FIG. 5. The SC transaction uses the data lines L100-0 to -3 for header cycle T0, address cycle T1 and data cycle T2, respectively. The header cycle T0 represents an instruction for the crossbar unit 40 and includes a header type T3 representing the distribution mode and a header port number T4 representing a distribution destination. The header cycle T0, which represents for the crossbar unit 40, is not output from the crossbar unit 40 to the boards 10-0 to -1, and 60-0 to -1. The address cycle T1 represents an instruction for the processor boards 10-0 to -1 or memory boards 60-0 to -1.

Regarding the meaning of each field, a transmission (TX) type T5 represents the transaction kind specified via the signal line L215, an address T6 represents the address specified via the signal line L214, and a port number T7 and a TX ID T8 are specified via the signal line L213. The data field in the data cycle T2 holds data to be sent during the data return from the memory board 60-0 to -1 or during the inter-processor board transfer from the processor board 10-0 to -1. To send 64 bytes data, eight cycles are necessary. It should be noted that in this mode the width of the signal lines L100-0 to -3, L400-0 to -3 connecting the crossbar unit 40 and individual boards is 8 bytes one way. When a coherent read request is sent, the data cycle T2 is not required.

The transaction sending circuit 22 generates a header type T3 in a header generation circuit by using the transaction type specified via the signal line L215. The header type is uniquely determined for any transaction type and there is a relationship illustrated in Table 1.

TABLE 1

| Transaction Type | Header Type | Distribution destination |
|---|---|---|
| Instruction read | QM | Only the memory board specified by the port number |
| Data read | MMC | All the processor boards and the specified memory boards |
| Data read invalidation | MMC | All the processor boards and the specified memory boards |
| Data return | SU | Specified processor board |
| Interprocessor board transfer | SU | Specified processor board |

When the transaction type is a data read or a data read invalidation, the port number of the memory board 60-0 to -1 to be accessed needs to be generated as the header port number T4. This is determined by the method of interleaving the memory boards 60-0 to -1 and the address to be accessed. Because this mode interleaves the memory boards in units of 64B, the port number is a port number 2 when the lower-order seventh bit of the address is 0 and a port number 3 when the seventh bit of the address is 1. This conversion is carried out by a main memory port number generation circuit 220 that has received the address via the signal line L214. The generated header port number T4 is merged with the header type T3 by a header generation circuit 221 and stored through the signal line L221 in a register 226 that holds the header cycle T0.

Stored in a register 225 holding the address cycle T1 are the transaction type received via the signal line L215, the address received via the signal line L214, and the port number and TX ID received via the signal line L213, all merged together. When the header cycle T0 and the address cycle T1 are both received, the selector 227 selects the header cycle T0 and the address cycle T1 in this order and sends them as the SC transaction on the signal line L100-i (i=0,1) to the crossbar unit 40.

When the address cycle T1 of the coherent read request is sent out, the transaction sending circuit 22 also sends the TXID T8 and address T6 to the transaction receive circuit 23. The transaction receive circuit 23 stores the TXID T8 and address T6 received in a TXID field 231 and an ADDR field 232 of a read data queue 230, respectively. In operation case 1, the transaction type is a data read and so the header type T3 in the header cycle T0 is MMC. In operation case 2 because the transaction kind is a data read invalidation, the header kind T3 in the header cycle T0 likewise is MMC. In either operation case, the header port number T4 in the header cycle T0 is 2 assuming the lower-order seventh bit of the address to be access is 0.

3.4 Multicast

The crossbar unit 40 that has received the SC transaction from the processor board 10-0 sends the transaction to the processor board 10-0 to -1 or memory boards 60-0 to -1 according to the specification of the header cycle T0. The operation during the multicast will be described below.

Figure 6:
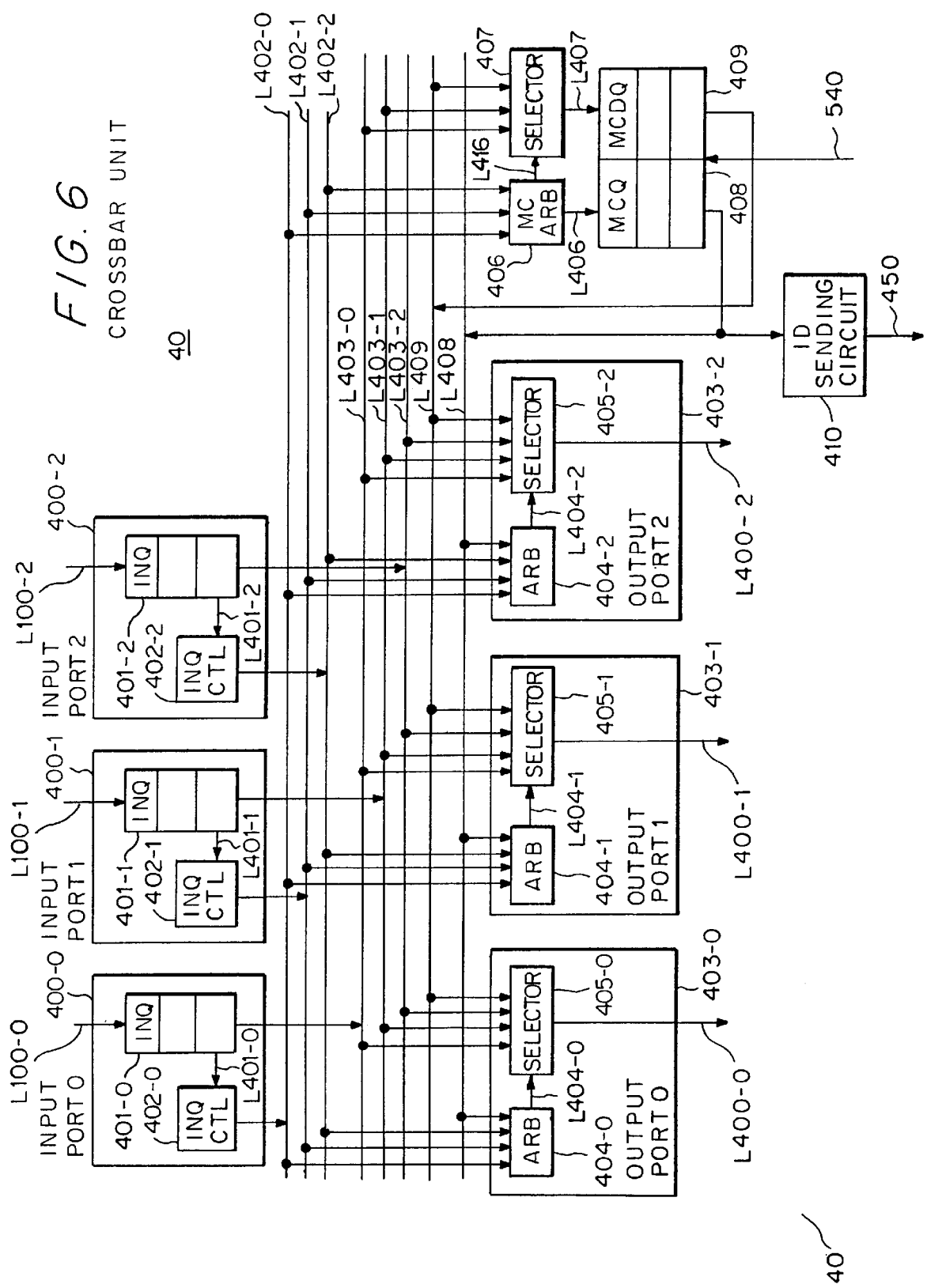
FIG. 6 is a block diagram of the crossbar unit used in the system of FIG. 1.

FIG. 6 illustrates the internal circuit of the crossbar unit 40. INQs 401-0 to -2 are queues for temporarily storing the SC transactions received from the memory boards 60-0 to -1. FIG. 6 illustrates only three ports for the sake of simplicity. INQCTLs 402-0 to -2 decode the header cycle T0 of the SC transaction present in the INQs 401-0 to -2 and, when the header kind T3 specifies a 1-to-1 transfer, sends an arbitration request to arbiters 404-0 to -2 of the output ports 403-0 to -2. When the header kind T3 specifies a multicast transfer, the INQCTLs 402-0 to -2 send an arbitration request to a multicast arbiter MCARB 406, which is characteristic of this invention. Signal lines L402-2 are used to send the arbitration request from the INQCTLs 402-0 to -2.

An MCARB 406 represents an arbiter for multicast transfer. An MCQ 408 is a queue holding the result of arbitration done by the MCARB 406 and is managed in-order in the order of arbitration. An MCDQ 409 is a queue to hold the address cycle T1 and data cycle T2 of the SC transaction selected according to the arbitration result of the MCARB 406 and is managed in an interlocking relationship with the MCQ 408. An ID sending circuit 410, according to the contents of the MCQ 408, sends to the coherency status report sum-up unit 50 a port number to which the CSS needs to be sent. ARBs 404-0 to -2 are circuits to arbitrate the arbitration requests from the INQCTL 402-0 to -2 and MCARB 406. The signal lines L403-0 to -2 and L409 are used to send the address cycle T1 and the data cycle T2 of the SC transaction from the INQ 401-0 to -2 and MCDQ 409.

Now, the operation of sending the coherent read request in operation case 1 will be described. First, an SC transaction arrives at the input port 400-0 connected to the processor board 10-0 and is stored in the INQ 401-0. The INQCTL 402-0 interprets the header cycle T0 of the SC transaction, beginning with the start entry of the INQ 401-0. In this case the header cycle T0 is an MMC and thus the header port number T4 represents the port number to which the memory board 60-0 or -1 to be specified is connected, that is, 2. After it has interpreted the header kind T3 is an MMC, the INQCTLs 402-0 sends the arbitration request, header kind T3 and header port number T4 through the signal line L402-0 to the MCARB 406.

The MCARB 406 arbitrates this request with the arbitration requests from other INQCTL 402-1 to -2 and, when the arbitration request from INQCTL 402-0 wins, stores in the MCQ 408 the distribution destination of the SC transaction destination, the port number which has won, the header port number T4 and the specification of whether or not to send the ID. In this case, the SC transaction is distributed to the port 0, port 1 and port 2, the port number which has won is 0, the header port number T4 is 2, and the need to send ID is 1. The need to send ID is "1" only when the header kind T3 is an MMC and otherwise "0". The selector 407 receives the result of arbitration made by the MCARB 406 and selects the address cycle T1, which has been sent from the input port specified by the arbitration result, i.e., input port 400-0, through the signal line L403-0 and then stores it in MCDQ 409.

When a busy signal 540 from the coherency status report sum-up unit 50 is not asserted, the crossbar unit 40 sends an arbitration request through the signal line L408 to the ARBs 401-0 to -2, to which the SC transaction stored in the head entry of the MCQ 408 is distributed. The MCDQ 409 sends the first SC transaction through the signal line L409 to the output ports 403-0 to 403-2. When the busy signal 540 from the coherency status report sum-up unit 50 is asserted, the crossbar unit 40 does not send an arbitration request from the MCQ 408. Each of the ARBs 404-0 to -2 arbitrates the arbitration request received and, when the arbitration request from the MCQ 408 wins, controls selectors 405-0 to -2 to send the SC transaction-which has been sent from the MCDQ 409 via the signal line L409-to the destinations i.e., the processor board 10-0, the processor board 10-1 and the memory board 60-0.

If the arbitration request from the MCQ 408 loses, each of the ARBs 404-0 to -2 is controlled so that on the next arbitration occasion the arbitration request from the MCQ 408 will surely win. When the arbitration is finished for all the ARBs, the MCQ 408 and MCDQ 409 dequeue the head entry. With the above control, the coherent read requests are arranged in-order in the computer system by the MCARB 406 and are sent in this order to the processor boards 10-0 to -1 or memory boards 60-0 to -1. The arrival times of these requests may not be the same.

When the busy signal 540 from the coherency status report sum-up unit 50 is not asserted, the ID sending circuit 410 sends the port number which has won and the header port number T4 in the MCQ 408 to the coherency status report sum-up unit 50 through the signal line L450 according to the information on the ID transfer at the head entry of the MCQ 408. When the busy signal 540 from the coherency status report sum-up unit 50 is asserted, this transfer is not performed.

Operation case 2 also performs steps similar to those of operation case 1.

3.5 Snoop Address Reception

Figure 4:
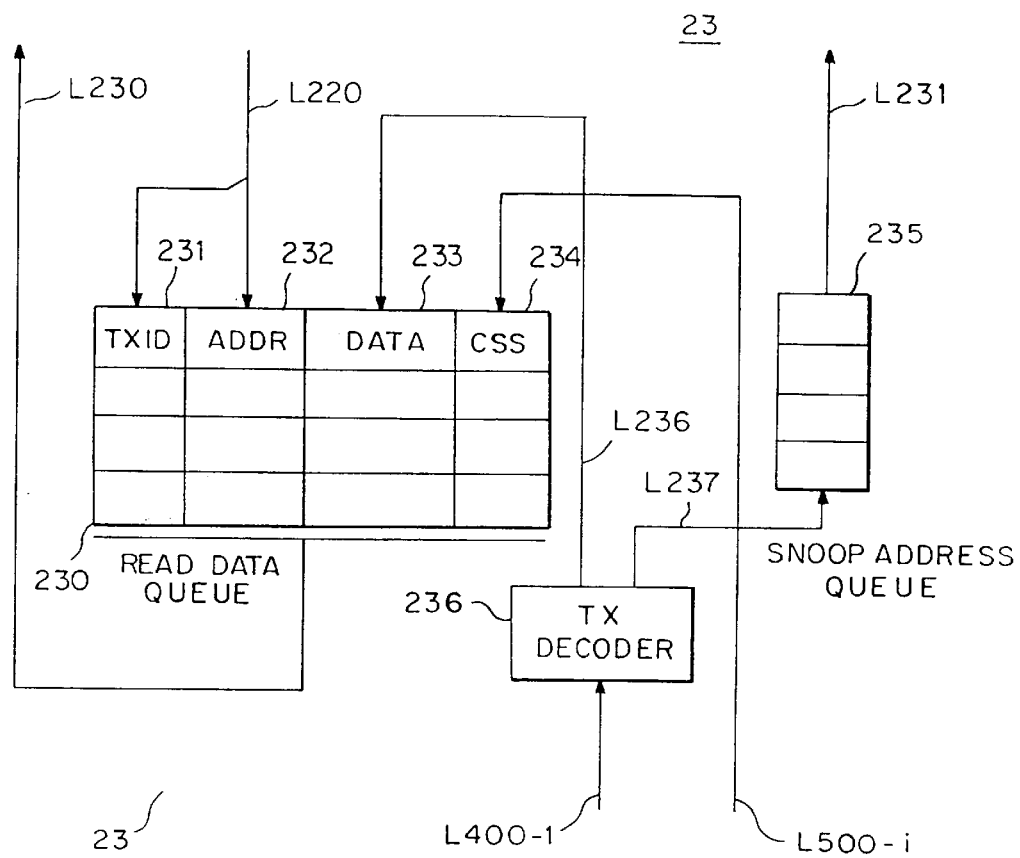
FIG. 4 is a block diagram of the transaction receiving circuit used in the system of FIG. 1.

FIG. 4 illustrates the internal configuration of the transaction receiving circuit. A TX decoder 236 interprets the SC transaction sent from the crossbar unit 40 and, when the received SC transaction is a coherent read request, stores it in a snoop address queue 235. When the received SC transaction is a data return or an inter-processor board transfer, the read data queue 230 stores the data cycle T2 of the SC transaction. As described in 3.3, the read data queue 230 also stores the TXID and address supplied from the transaction sending circuit 22, stores the coherency status summary CSS sent from the coherency status report sum-up unit 50, and performs the data arrival control. This operation will be described in section 3.11.

When it receives the snoop address in the operation case 1, the processor board 10-i that has received the SC transaction from the crossbar unit 40 via the signal line L400-i (i=0,1) interprets the SC transaction by the TX decoder 236. Because the TX kind T5 of the address cycle T1 of the SC transaction is a data read, the TX decoder 236 sends the SC transaction through the signal line L237 to the snoop address queue 235 where it is stored. The snoop address queue 235 is managed in-order and sends a coherent read request from the first entry of the queue via the signal line 231 to the cache access controller 21.

During the snoop address reception in operation case 2, because the TX kind T5 of the address cycle T1 of the SC transaction is a data read invalidation, the contents of the operation are similar to those described above.

3.6 Issuing Coherency Status Report

Of the coherency status report issuing operations, the cache access operation will be described referring to FIG. 2. The cache access controller 21 that has received the coherent read request via the signal line 231 accesses the cache 12 by using the signal line L212 and obtains the status of the cache line through the signal line L120. The status of the cache line is also sent to the transaction sending circuit 22. At this time, the cache access controller 21 sends the transaction kind to the transaction sending circuit 22 through the signal line L215.

The cache access controller 21 updates the cache line state, if necessary, depending on the transaction kind in the coherent read request and the state of the cache line obtained. Updating is required in the following cases. For example, when the transaction kind is a data read invalidation and the cache line state is other than "invalid," the cache access controller 21 updates the state of the cache line to "invalid." When the transaction kind is a data read and the cache line state is "clean," the state of the cache line is updated to "shared." When the transaction kind is a data read and the cache line state is "dirty," the cache line state is updated to "invalid." The updating operation of the cache state is similar to that of the conventional snoop cache, and therefore detailed descriptions of its control operation will be omitted.

Next, the process of issuing the coherency status report will be described referring to FIG. 3. The coherency status report generation circuit 222 in the transaction sending circuit 22 receives the status of the cache line from the cache 12 via the signal line L120 and also receives the transaction kind from the cache access controller 21 via the signal line L215. On the basis of the information, the coherency status report CSR is generated referring to Table 2.

TABLE 2

| Transaction kind | Cache state | Coherency status report |
|---|---|---|
| Data read | Invalid | DONE |
|  | Shared | SHARE |
|  | Clean | SHARE |
|  | Dirty | DIRTY |
| Data read invalidation | Invalid | DONE |
|  | Shared | DONE |
|  | Clean | DONE |
|  | Dirty | DIRTY |

The generated coherency status report CSR is stored in the coherency status report storage register 223 and sent to the coherency status report sum-up unit 50 via the signal line L101-i (i=0,1). In operation case 1, the processor board 10-0 generates the coherency status report of DONE because the status of the case received by the coherency status report generation circuit 222 is "invalid" and the transaction kind is a data read. The processor board 10-1 operates in a similar way.

In operation case 2, the processor board 10-0 generates the coherency status report of DONE because the status of the cache received by the coherency status report generation circuit 222 is "invalid" and the transaction kind is a data read invalidation. As to the operation of the processor board 10-1, the coherency status report generated is DIRTY as the cache line state received by the coherency status report generation circuit 222 is "dirty" and the transaction kind is a data read invalidation.

3.7 Issuing Data Transaction

When the cache line status is "dirty" for the coherent read request, the cache access controller 21 must generate an SC transaction for data transfer between the processor boards 10-0 to -1 and send the generated transaction to the coherent read requesting processor board 10-0 to -1.

In FIG. 2, the cache access controller 21, which has received the coherent read request from the snoop address queue 235 via the signal line 231, accesses the cache 12 and obtains the cache line status via the signal line L120, as described in section 3.6. When the cache line status is "dirty," the cache access controller 21 sends an inter-processor board transfer as the transaction kind to the transaction sending circuit 22 via the signal line 231. It also sends the address part of the coherent read request via the signal line L214, and sends the port number and TXID of the coherent read request via the signal line L213 to the transaction sending circuit 22.

The transaction sending circuit 22, according to the procedure described in section 3.3, sends the inter-processor board transfer transaction to the crossbar unit 40 via the signal line L100-i (i=0,1). The operation, however, differs from the procedure of (3-C) in the following points. First, in the header generation circuit 221, the header port number is the port number supplied via the signal line L213. Further, the data supplied from the cache via the signal line L120 is stored in the register 224 and added as the data cycle T2 after the address cycle T1 of the SC transaction.

The above operation is performed by the processor board 10-1 in the operation case 1.

3.8 Coherency Status Summary

Figure 7:
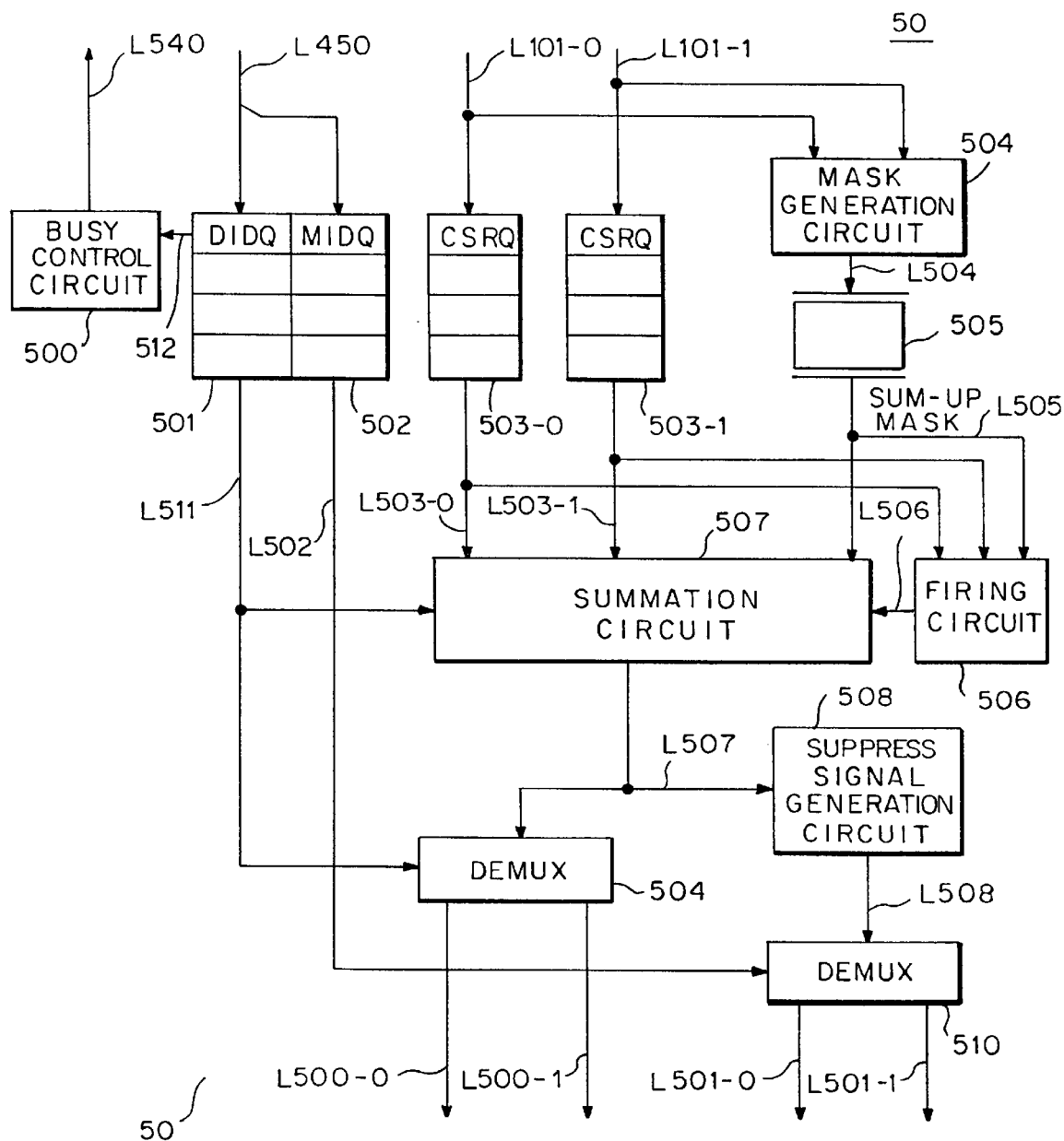
FIG. 7 is a block diagram of the coherency status report sum-up unit used in the system of FIG. 1.

The operation of the coherency status summary will be described referring to FIG. 7. In the coherency status report sum-up unit 50, CSRQ 503-0 to -1 are queues to temporarily store the coherency status reports CSR sent from the processor boards 10-0 to -1 and are managed in-order. DIDQ 501 is a queue that holds the port numbers to which the coherency status summary CSS is to be sent. MIDQ 502 is a queue that stores the port numbers to which a data transfer allowance signal or a data transfer suppress signal is to be sent. The DIDQ 501 and MIDQ 502 are managed in-order. A sum-up circuit 507 is a circuit to sum up the contents of the CSRQ 503-0 to -1 and is started by a firing logic 506. A suppress signal generation circuit 508 sends a data transfer allowance signal or a suppress signal to the memory boards 60-0 to -1 based on the CSS produced by the sum-up circuit 507.

The operation flow will be described below. The coherency status report sum-up unit 50, as described in section 3.4, first takes in from the crossbar unit 40 via the signal line L450 the CSS destination port numbers and the memory board port numbers used for data transfer suppression and then stores them in DIDQ 501 and MIDQ 502, respectively.

Next, as described in section 3.6, the coherency status report sum-up unit 50 receives the coherency status reports CSR from the processor boards 10-0 to -1 via the signal lines L101-0 to -1 and stores them in CSRQ 503-0 to -1 that correspond to the respective ports. Information on whether an valid CSR exists at the head entry in the CSRQ 503-0 to -1 is reported to the firing logic 506 through the signal lines L503-0 to -1. The contents of the summary mask 505 representing which port the processor board 10-0 to -1 is connected to are reported to the firing logic 506 via the signal line L505. Bits of the summary mask 505 have one-to-one correspondence with the ports. When the bit is "1," this represents that the processor board 10-0 to -1 is connected to that port. In this mode, the bits of the summary mask are all "1." When it is reported via the signal lines L503-0 to -1 that, in all the ports with the summary mask of "1," there exist CSRs at the head entry of the corresponding CSRQ 503-0 to -1, the firing logic 506 decides that the summation of the CSRs is possible and starts the sum-up circuit 507 through the signal line L506.

The sum-up circuit 507 is supplied with the CSRs from the CSRQ 503-0 to -1 via the signal lines L503-0 to -1. It is also supplied with the contents of the summary mask 505 via the signal line L505. Further, the sum-up circuit 507 is notified of the presence of the destination port number from the DIDQ 501 via the signal line L511. The sum-up circuit 507, under the condition illustrated in Table 3, sums up the CSRs to generate the CSS. For the ports whose summary map 501 bit is "0," the CSRs are all deemed as "DONE."

TABLE 3

| CSR | CSS |
|---|---|
| All are DONE | DONE |
| At least one is SHARED, the others are DONE | SHARED |
| Only one is DIRTY, the others are DONE | DIRTY |
| Other than the above | ERR |

The sum-up circuit 507, when a CSS is generated, also checks the validity of the contents of the head entry in the DIDQ 501 supplied via the signal line L511 and, if it is found to be invalid, replaces the CSS with an ERR. The sum-up circuit 507 transfers the generated CSS to the DeMUX 504 (demultiplexer) via the signal line L507. The DIDQ 501 sends the contents of its head entry or the destination port number to the DeMUX 504 via the signal line L511. The DeMUX 504, according to the reported destination port number, sends the CSS to the processor boards 10-0 to -1 via the signal lines L500-0 to -1. The sum-up circuit 507 also sends the generated CSS to the suppress signal generation circuit 508 via the signal line L507. The suppress signal generation circuit 508 sends the suppress signal when the CSS is DIRTY and, otherwise, a transfer allowance signal to the DeMUX 510 via the signal line L508. The MIDQ 502 sends the memory board port number present in its head entry to the DeMUX 510 via the signal line L502. The DeMUX 510 transfers the suppress signal or a transfer allowance signal through the signal line L501-0 to -1 to the memory board 60-0 to -1 indicated by the specified memory port number.

When the arrival of a CSR from a certain processor board 10-i (i=0,1) is delayed for some reason, such as a delay in the access to the cache 12, the CSRQ 503-j (j=0,1), which corresponds to the other processor board 10-j (j=0,1), may overflow. To avoid this overflow, a method may be used in which the coherency status report sum-up unit 50 reports the busy state of the CSRQ 503-0 to -1 to the processor boards 10-0 to -1. This method, however, increases the number of pins of the coherency status report sum-up unit 50 and of the processor boards 10-0 to -1. In this mode therefore, the queue lengths of the DIDQ 501 and MIDQ 502 are set equal to or smaller than the queue lengths of the CSRQ 503-0 to -1. When the DIDQ 501 tends to overflow, the busy state is reported to the crossbar unit 40 to suppress the multicast of the coherent read requests. This can limit the maximum number of CSRs that can exist simultaneously to the number of CSRs registered in the DIDQ 501, thereby preventing the overflow of the CSRQ 503-0 to -1. The use of this method only requires one busy signal L540 between the crossbar unit 40 and the coherency status report sum-up unit 50, rendering the busy lines for all CSRQ 503-0 to -1 unnecessary. In the operation, a busy control circuit 500 manages the number registered in the DIDQ 501 and, when an overflow tends to occur, asserts the busy signal L540. When the busy signal L540 is asserted, the multicast is suppressed as described in section 3.4.

There are various ways to set the summary mask 505. In this mode, at the system startup, the processor boards 10-0 to -1 each send a fixed pattern, such as DONE, to the coherency status report sum-up unit 50 via the signal lines L101-0 to -1 for a predetermined period. The mask generation circuit 504 in the coherency status report sum-up unit 50, upon recognizing this fixed pattern, sets "1" to the bit in the summary mask 505 that corresponds to the processor board 10-0 to -1 that is transmitting DONE and sets "0" to other bits. Other methods include one in which the register holding the summary mask is mapped in a certain I/O space and the CPU core 11 performs write into this I/O space to make a desired setting.

In the operation case 1, the above operation causes "0" to be stored in the DIDQ 501 and "2" in the MIDQ 502 according to the contents sent from the crossbar unit 40. All the CSRs sent from the processor boards 10-0 to -1 are DONE and the CSS generated by the sum-up circuit 507 is DONE. This is sent to the processor board 10-0 and the transfer allowance signal is sent to the memory board 60-0.

In the operation case 2, the above operation causes "0" to be stored in the DIDQ and "2" in the MIDQ according to the contents sent from the crossbar unit 40. Because the CSR sent from the processor board 10-0 is DONE and the CSR sent from the processor board 10-1 is DIRTY, the CSS generated by the sum-up circuit 507 is DIRTY. This is sent to the processor board 10-0 and the transfer suppress signal is sent to the memory board 60-0.

In this mode, the crossbar unit 40 sends the CSS destination port number and the memory port number used for suppressing the data transfer to the coherency status report sum-up unit 50. The port numbers may be generated and transferred as follows. That is, these port numbers can be generated by each of the processor boards 10-0 to -1 based on the address cycle T1 in the coherent read transaction, and the generated port numbers can then be transferred by the processor boards 10-0 to -1 to the coherency status report sum-up unit 50 via the signal line L101-0 to -1 at the time of sending the CSR. In this case, however, because the number of signal lines L101-0 to -1 increases, the number of pins of the coherency status report sum-up unit 50 also increases. In this mode, therefore, these port numbers are sent from the crossbar unit 40 at the time of sending the coherent read transaction. This reduces the number of pins of the coherency status report sum-up unit 50.

3.9 Issuing Data Transaction/Suppressing Data Transfer

The operation of issuing a data transaction and suppressing a data transfer performed by the memory boards 60-0 to -1 will be described referring to FIG. 8. The memory boards 60-0 to -1 each have a main memory 61 and a main memory controller 70. The main memory controller 70 has a coherent read queue 701 for holding an address and data for coherent read and an instruction read queue 706 for holding an address and data for instruction read. The coherent read queue 701 and the instruction read queue 706 are processed in the order of receiving the SC transaction. The reason why the coherent read queue 701 and the instruction read queue 706 are separated is that data transfer to the processor boards 10-0 to -1 can be suppressed with respect to the coherent read.

A TX decoder 700 in the main memory controller 70 receives the SC transaction from the crossbar unit 40 via the signal line L400-i (i=0,1), decodes the TX kind T5 and, if the decoded TX kind represents a data read or data read invalidation, stores the address T6, port number T7 and TXID T8 of the address cycle T1 in the ADDR field 703, DID field 714 and TXID field 702, respectively, of the coherent read queue 701. When the TX kind T5 is an instruction read, the TX decoder 700 stores the address T6, port number T7 and TXID T8 of the address cycle T1 in the ADDR field 708, DID field 715 and TXID field 707, respectively, of the instruction read queue 706. The coherent read queue 701 sends the address (ADDR) at the head entry via a signal line L713 to the arbitration/selector 710 which, when the ADDR wins in the arbitration, sends the ADDR to the main memory 61 via a signal line L1710 to access the main memory 61.

The data obtained as a result of the access is transferred via a signal line L610 to the coherent read queue 701 where it is stored in the corresponding entry. In parallel with this operation, the main memory controller 70 receives a suppress signal or transfer allowance signal from the coherency status report sum-up unit 50 via a signal line L501-i (i=0,1) and successively stores them in an EN field 705 of the coherent read queue 701. When the DATA field 704 and the EN field 705 in the head entry of the coherent read queue 701 become valid, the contents of the head entry of the coherent read queue 701 are transferred to the transaction generation circuit 711 via a signal line L701. The transaction generation circuit 711, if the EN field 705 is a suppress, only dequeues data from the coherent read queue 701 and does not send it to the processor boards 10-0 to -1. If the EN field 705 is a transfer allowance, the transaction generation circuit 711 generates an SC transaction according to the contents of the coherent read queue 701.

At this time, the header kind T3 and the header port number T4 in the header cycle T0 are SU and the contents of the DID field 714, respectively. The TX kind T5, address T6, port number T7 and TXID T8 in the address cycle T1 are a data return, the contents of ADDR field 703, the contents of DID field 714 and the contents of TXID field 702, respectively. As to the data cycle T2, the contents of the DATA field 704 are divided into eight cycles and then transferred. The transaction generation circuit 711 sends the generated SC transaction via a signal line L711 to the arbitration/selector 713, which transfers the SC transaction that has won in the arbitration from the main memory controller 70 to the crossbar unit 40. The operation of the instruction read queue 706 is similar to that of the coherent read queue 701, except that the EN field 705 does not exist and thus there is no data return suppress.

In the operation case 1, the TX kind T5 is a data read. Because the main memory controller 70 receives a transfer allowance signal from the coherency status report sum-up unit 50, the main memory controller 70 sends a data return as the SC transaction to the crossbar unit 40.

In the operation case 2, the TX kind T5 is a data read invalidation. Because the main memory controller 70 receives a transfer suppress signal from the coherency status report sum-up unit 50, the main memory controller 70 does not send the SC transaction but only dequeues the coherent read queue.

3.10 One-to-One Transfer

In the operation case 1, the operation of the crossbar unit 40 performed during the data return transaction from the memory board 60-0 to the processor board 10-0 will be described referring to FIG. 6. The crossbar unit 40 receives the SC transaction from the memory board 60-0 via the signal line L100 -2 and stores it in INQ 401-2. INQCTL 402-2 interprets the header cycle T0 at the head entry of the INQ 401-2 and, if the header kind T3 is found to be SU, sends an arbitration request via the signal line L402-2 to ARB 404-0 that corresponds to the output port 403-0 specified by the header port number T4 of the header cycle T0. The ARB 404-0 performs the arbitration and, if the request from the INQCTL 402-2 wins, reports the result of arbitration via a signal line L404-0 to a selector 405-0, which selects the address cycle T1 and the data cycle T2 supplied from the INQ 401-2 via a signal line L403-2 and sends the SC transaction to the processor board 10-0 via a signal line L400-0.

The inter-processor board transfer in the operation case 2, too, is similar to the above operation flow except that the issuing source of the SC transaction is the processor board 10-1 and the input port that receives the SC transaction is an input port 400-1.

In the SC transaction that is sent during the instruction read, the header kind T3 is QM. This transfer sequence is similar to the one described above when the header kind T3 is SU.

3.11 Receiving Data/State

In the following, the control for receiving data and CSS performed by the processor boards 10-0 to -1 will be described. A read data queue 230 in the transaction receive circuit 23 is a queue for waiting the return of data and the arrival of the CSS. In a TXID field 231 and an ADDR field 232 in the read data queue 230, TXID and address supplied from the transaction send circuit 22 are stored when a coherent read request is issued. In a DATA field 233 the data cycle T2 of the data return transaction or the inter-processor board transfer transaction is stored. In a CSS field 234 a CSS is stored. The storing in the TXID field, ADDR field and CSS field are performed in-order. The storing in the DATA field is performed out-of-order and the entry to be stored is searched with TXID as a key. The dequeuing of the read data queue is performed in-order.

The data/CSS reception operation in the operation case 1 will be described. The transaction receive circuit 23 interprets the SC transaction supplied via the signal line L400-i (i=0,1) by a TX decoder 236 and, because the TX kind T5 is a data return, stores the data cycle T2 of the SC transaction via the signal line L236 into the entry in the read data queue 230 having the same contents of the TXID field 231 as the contents of TXID T8 in the address cycle T1. Asynchronously with this operation, the transaction receive circuit 23 receives CSSs supplied from the coherency status report sum-up unit 50 via the signal line L500-i (i=0,1) and stores them successively in the CSS field 234 of the read data queue 230. The CSSs are expected to arrive in the order of issuing the coherent read requests, whereas the data may be returned irrespective of the order of issuing the coherent read requests. If at the head entry of the read data queue 230 the DATA field 233 and the CSS field 234 become valid, the contents of this entry are all sent to the cache access controller 21 via the signal line L230.

In the operation case 2, the operation is similar to the above although the TX kind T5 is an inter-processor board transfer, not the TX kind T5.

3.12 Cache Registration/CPU Core Response

In FIG. 2, the cache access controller 21 that has received return data from the transaction receiving circuit 23 via the signal line L230 stores the data and the cache status in the cache 12 by using the address specified by the ADDR field. The cache status to be stored is "clean" when the CSS field is DONE, "shared" when the CSS field is SHARED and "dirty" when the CSS field is DIRTY. The cache access controller 21 sends TXID and return data to the CPU core 11 via the signal line L210. This operation is almost the same as the conventional snoop cache control, and therefore its detailed description will be omitted.

Figure 11:
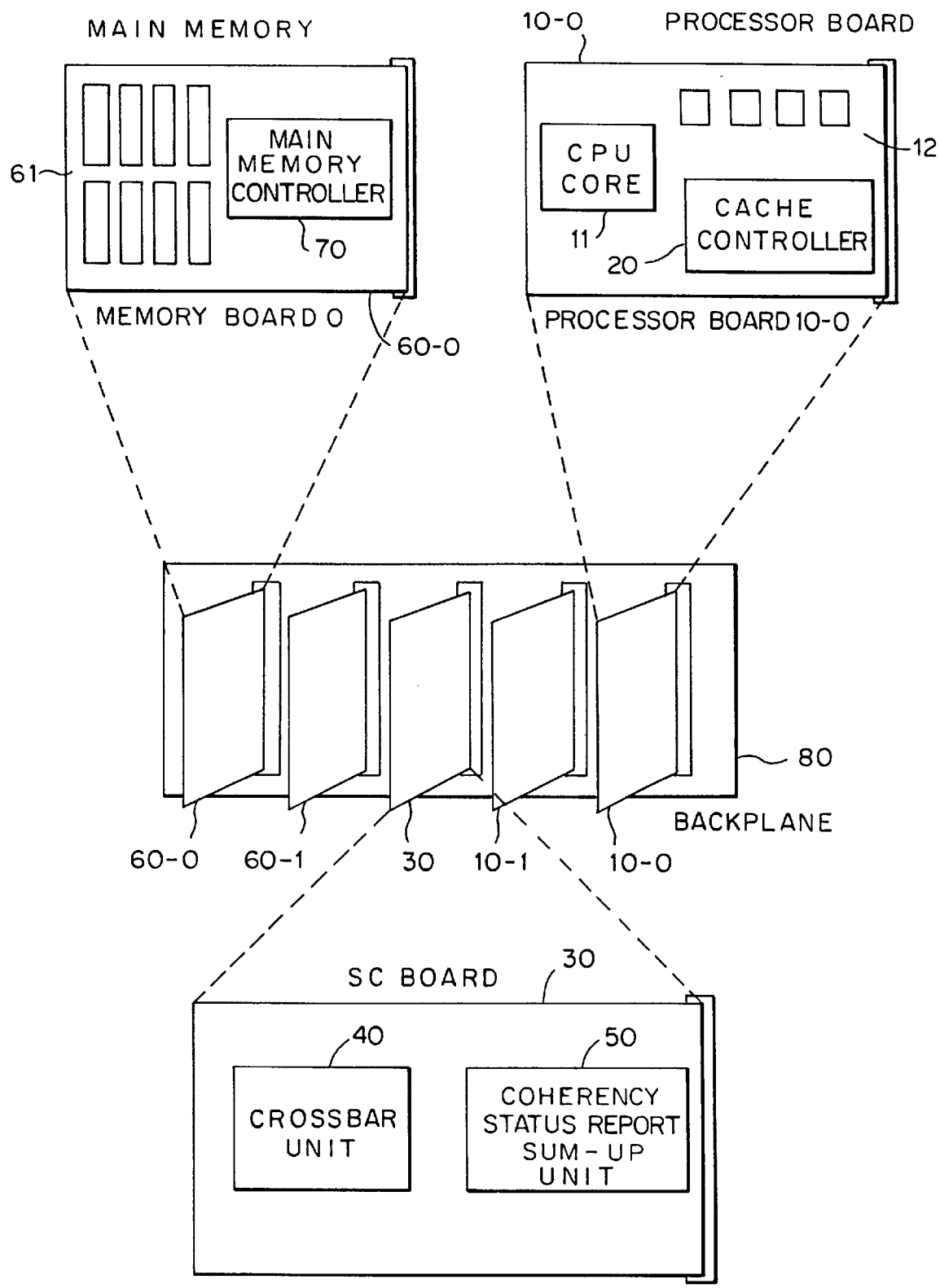
FIG. 11 is a mounting diagram of the system of FIG. 1.

FIG. 11 illustrates the mounting diagram of the first mode. One processor board 10-i (i=0,1) is mounted on a single board and one memory board 60-i (i=0,1) is also mounted on a single board. The crossbar unit 40 and the coherency status report sum-up unit 50 are mounted on the same SC board.

These boards are plugged into a backplane 80 to build a computer system. The processor board 10-0 to -1 or memory board 60-0 to -1 can be increased as long as the number of ports of the SC board 30 is large enough, and can also be decreased to a minimum system.

Modification of Mode 1 of the Invention (1) While the mode 1 employs the store-in scheme for the control of the cache 12, this may be changed to the store-through scheme. In this case, the operation flow itself is similar to the mode 1 except that the DIRTY state does not exit as the cache state.

(2) While the mode 1 uses two processor boards 10-0 to -1 and two memory boards 60-0 to -1, a greater number of these may be connected. This can be realized by increasing the number of circuits associated with the input ports and the output ports of the crossbar unit 40 and the coherency status report sum-up unit 50.

(3) Although in the mode 1 the crossbar unit 40 and the coherency status report sum-up unit 50 are mounted on the same board, these may be mounted on separate boards. Alternatively, either or both of the crossbar unit 40 and the coherency status report sum-up unit 50 may be mounted on the backplane.

(4) In the mode 1, when a processor board 10-j (j=0,1) other than the processor board 10-i (i=0,1) that has issued the coherent read request has the latest data, the data transfer from the memory board 60-0 to -1 is suppressed. This operation is based on the assumption that the summation of the coherency status reports is completed earlier than the access to the main memory in the memory board 60-0 to -1. If the summation of the coherency status reports cannot be completed earlier than the memory access because of the design limitation, the sending of the data return transaction from the memory board 60-0 to -1 is delayed to that extent. To avoid this, the following method may be used. That is, the data transfer suppression is not performed in the memory board 60-0 to -1 and the data transaction is sent directly to the processor board 10-0 to -1. The processor board 10-0 to -1 stores in the DATA field of the read data queue in the transaction receive circuit 23 both the data obtained by the data return from the memory board 60-0 to -1 and the data obtained by the inter-processor board transfer from the other processor board 10-0 to -1. When the CSS arrives, if the CSS is DIRTY, the data obtained by the inter-processor board transfer is made valid and, otherwise, the data obtained by the data return is validated.

Mode 2 of the Invention

In the mode 1, the processor boards 10-0 to -1 each have only one CPU core 11. In this case, to increase the number of CPU cores 11 in the whole computer system requires increasing the number of ports of the crossbar unit 40 and the coherency status report sum-up unit 50. The increase in the number of ports, however, is limited by the restrictions on the number of pins and gates. Therefore let us consider a case where a plurality of CPU cores 11 are mounted on one processor board 10-0 to -1.

(1) Configuration of the System

Figure 12:
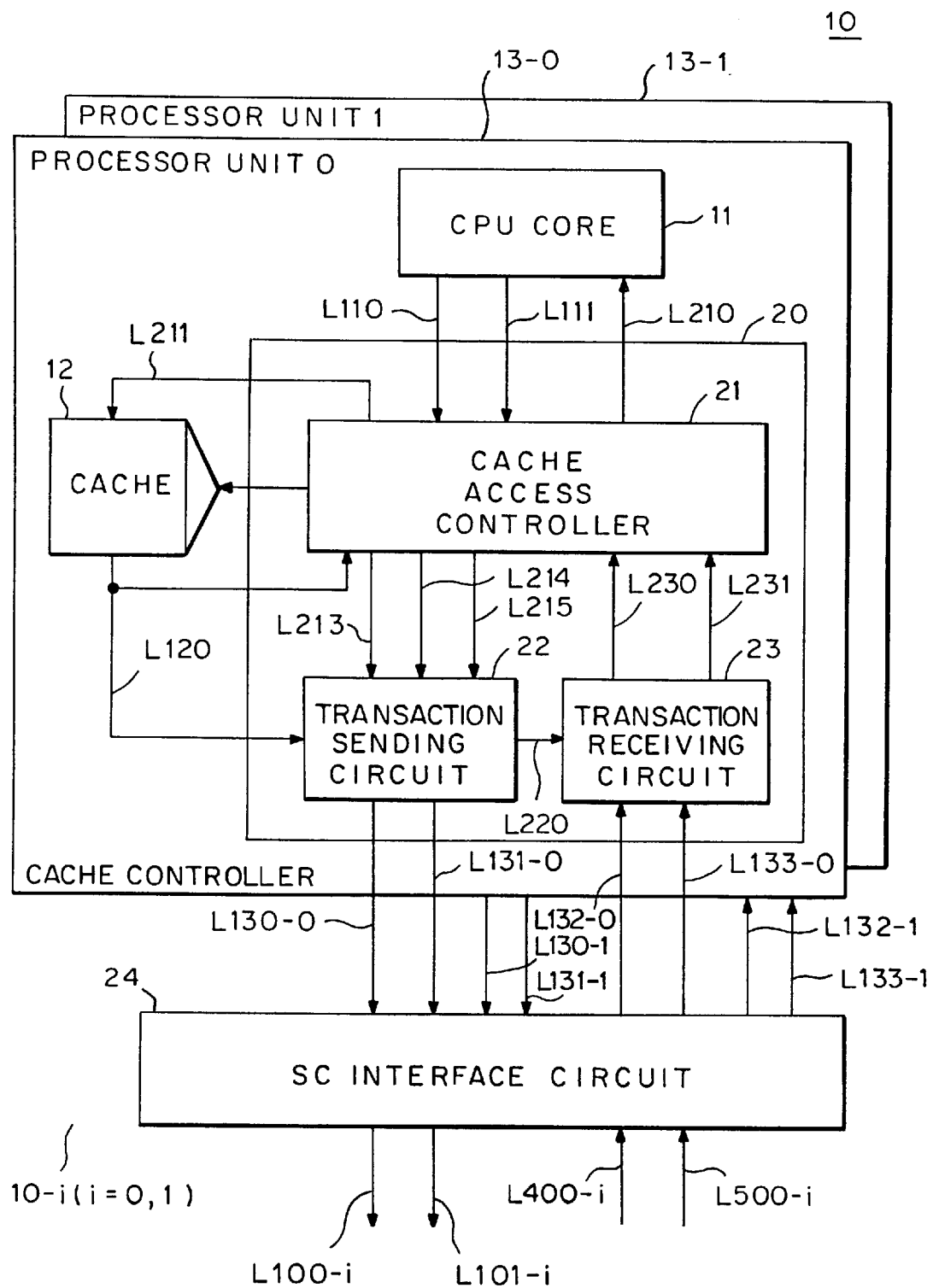
FIG. 12 is a block diagram of the processor board used in the system of FIG. 1.

The configuration of the processor board 10-0 to -1 of the mode 2 will be described referring to FIGS. 12 and 13. In FIG. 12, the CPU core 11, the cache controller 20 and the cache 12 together will be referred to as processor units 13-0 to -1. The mode 2 differs from the mode 1 in that the processor boards 10-0 to -1 each have two processor units 13-0 to -1 and an SC interface circuit 24 is provided between the processor units 13-0 to -1 and the SC board. In FIG. 13, the SC interface circuit 24 includes TXQs 240-0 to -1 that receive SC transactions from the processor units 13-0 to -1, a local summation circuit 244 that sums up the CSRs in the processor board 10-0 to -1, and an SRCQ 248 that specifies to which of the processor units to send the CSS from the coherency status report sum-up unit 50.

The SC interface circuit 24 also includes, as the constitutional elements associated with the local summation circuit 244, LCSRQs 242-0 to -1 to store the CSRs from the processor units 13-0 to -1 and a local summation map 243 showing whether each of the processor units 13-0 to -1 exists or not. The local summation map illustrates with a corresponding bit which of the processor units 13-0 to -1 is mounted. This configuration allows the number of CPU cores 11 to be increased without having to increase the number of ports of the SC board 30.

In the following, only the points in which the mode 2 differs from the mode 1 in terms of the processing of the coherent read request will be described, and the description of processing which is the same as those of mode 1 will be omitted.

3.3 Issuing the SC Transactions

In the mode 1 the TXID T8 in an SC transaction is sent from the CPU core 11 via the signal line L111. In this mode 2, to the TXID sent from the CPU core 11 a self processor unit identifier PUID is attached. The PUID is determined by the mounting position of the processor unit 13-0 or -1 in the processor board 10-0 or -1. The PUID is added to the TXID T8 when the transaction sending circuit 22 generates the address cycle T1.

While the mode 1 sends the SC transactions, after being generated, to the crossbar unit 40 via the signal lines L100-i (i=0,1), this mode 2 sends them to the SC interface circuit 24 via the signal lines L130-0 to -1. The SC interface circuit 24 stores the received SC transactions in the corresponding TXQ 240 -0 to -1. The SC transactions are read out from the head entry of each TXQ 240-0 to -1 and sent to an arbitration/selector 245. The arbitration/selector 245 performs arbitration of the SC transactions and transfers the transaction which has won to the crossbar unit 40 via the signal line L100-i (i=0,1). When the SC transactions are sent to the crossbar unit 40, the arbitration/selector 245 also stores the PUID in the TXID of the address cycle T1 into the SRCQ 248 via the signal line L245. This is because the processor unit 13-0 or -1 to which the reply is to be sent when the CSS described later arrives.

3.5 Receiving the Snoop Address

In the mode 1 the SC transaction that the crossbar unit 40 has transmitted via the signal line L400-i (i=0,1) is directly received by the transaction receive circuit 23. However, in this mode, the SC transaction is received by the SC interface circuit 24. The SC interface circuit 24 interprets the address cycle T1 by the reception control circuit 246. When the TX kind T5 is a coherent read request, the SC interface circuit 24 sends the SC transaction to the processor units 13-0 to -1 via the signal lines L132-0 to -1.

3.6 Issuing the Coherency Status Report

In the mode 1, the generated coherency status reports are summed up only by the coherency status report sum-up unit 50 and, if this procedure is applied as it is, a need arises for the CSRs sum-up unit 50 to have a CSRQ 503-i (i is an arbitrary integer) corresponding to the processor unit 13-i (i is an arbitrary integer). This imposes a limit on an increase in the number of CPU cores 11 by the number of gates that can be equipped to the coherency status report sum-up unit 50. Hence in this mode, the CSRs are summed up for each processor board 10-0 to -1 and the results of summation are sent to the coherency status report sum-up unit 50 for the entire summary. The summation algorithm illustrated in Table 3 has a characteristic that the same result is obtained for an arbitrary number of CSSs whichever CSS the summation algorithm begins with. The use of this characteristic allows the CSSs to be summed up locally in the processor board 10-0 to -1.

While in the mode 1 the CSS generated by the transaction send circuit 22 is transferred to the coherency status report sum-up unit 50 via the signal lines L101 -i (i=0,1). In the mode 2 the CSS is sent to the SC interface circuit 24 via the signal lines L130-0 to -1. The SC interface circuit 24 stores the received CSRs in the LCSRQ 242-0 to -1. The LCSRQ 242-0 to -1 are controlled in-order. The contents of the LCSRQ 242-0 to -1 are sent, beginning with the head entries, to the local summation circuit 244. The local summation circuit 244 deems that the contents of the LCSRQ 242-0 to -1 corresponding to the "0" bit in the local summation map 243 are always DONE, and performs summation according to the algorithm in Table 3. The CSSs thus generated are each treated as the CSR for each processor board 10-0 to -1 and transferred to the coherency status report sum-up unit 50 via the signal lines L101-i (i=0,1).

3.7 Issuing the Data Transaction

In the operation case 2 of the mode 1, the processor board 10-1 sends the SC transaction, after being generated, to the crossbar unit 40 via the signal line L100-1. In this mode 2, the path is changed to the one through which the transaction is sent to the SC interface circuit 24 via the signal line L130-0 to -1. The SC interface circuit 24 stores the received SC transactions in the corresponding TXQ 240-0 to -1. The processing of issuing the system connection transaction from each TXQ 240-0 to -1 to the crossbar unit 40 is similar to the operation of (3-C) in this mode, except that the PUID is not transferred to SRCQ 248.

3.11 Receiving Data/Status

In the processor board 10-0 of the mode 1 the SC transaction from the crossbar unit 40 is received directly by the transaction receive circuit 23 via the signal line L400-0. In this mode 2, the SC transaction is first received by the SC interface circuit 24, and then the reception control circuit 246 interprets the address cycle T1. When the TX kind T5 in the address cycle T1 is a data return or an inter-processor transfer, the SC transactions are transferred via the signal line L132-0 to -1 to the processor unit 13-0 to -1 specified by the PUID in the TXID T8.

In the mode 1 the CSS from the coherency status report sum-up unit 50 is received directly by the transaction receive circuit 23 via the signal line L500-i (i=0,1); in this mode 2 first the CSS is received by the SC interface circuit 24 and then transferred via the signal line L133-0 to -1 to the processor unit 13-0 to -1 specified by the contents of the head entry of the SRCQ 248.

The operation of the processor unit 13-0 or -1 that has received the data and the CSS is similar to that of the processor board 10-0 or -1 in the mode 1.

Mode 3 of the Invention

In the mode 1, the coherency status report sum-up unit 50 sums up and send the CSRs after all the CSRs have arrived, in the order of coherent read requests sent from the crossbar unit 40. The mode 3 differs from the mode 1 in that "the summation of the CSRs is carried out after the CSS is established" and "the CSSs are sent irrespective of the order of the coherent read requests." That is, considering the characteristic of the CSS, if at least one CSR from the processor board 10-0 or -1 is SHARED, the CSS is defined as SHARED irrespective of the results of other CSRs. If the CSR from one of the processor board 10-0 or -1 is DIRTY, the CSS is defined as DIRTY regardless of the contents of other CSRs. This, however, is based on the assumption that there is no improper combination of CSRs described in the mode 1. Thus, on the assumption that there is no improper CSR combination, the CSS, as soon as it is defined, is transferred to the processor boards 10-0 to -1.

If an improper coherency status report combination is found after all the CSRs have arrived, ERR is sent as the CSS to the processor boards 10-0 to -1 whether the CSS is already issued or not. Hence, even when the CSR of a certain processor board 10-i (i=0,1) is delayed significantly, this mode can quicken the return of data to the CPU core 11 because the subsequent CSSs can be issued independently of the delayed CSR, whereas in the mode 1 the issuance of all the CSSs is delayed. The transfer of the CSR from each processor board 10-0 to -1 to the coherency status report sum-up unit 50 is performed in the order of coherent read requests as in the mode 1.

(1) Configuration of the System

The mode 3 differs from the mode 1 in the configuration of the coherency status report sum-up unit 50. FIG. 14 illustrates the internal configuration of the coherency status report sum-up unit 50. The coherency status report sum-up unit 50 has port summation circuits 525-0 to -1 corresponding to the output ports. The port summation circuits 525-0 to -1 have a CSR table 526 and a summation circuit 530. The CSR table 526 has a TXID field 527, a MID field 528, and CSR fields 529-0 to -1 corresponding to the input ports. On the input side the coherency status report sum-up unit 50 has DIDQ 521-0 to -1 for specifying in which port summation circuit the CSR from the processor board 10-0 to -1 is to be stored.

In the following, only the points in which the mode 3 differs from mode 1 in terms of the processing of coherent read request will be described and the description of the processing which is the same as those of mode 1 are omitted.

3.6 Issuing the Coherency Status Report

In the mode 1, only the CSR is sent from the processor board 10-0 to -1 to the coherency status report sum-up unit 50 via the signal line L101-0 to -1. In the mode 3, on other hand, a TXID is attached to the CSR before being sent. That is, the coherency status report generation circuit 222, after generating a CSR as in the mode 1, takes in the TXID supplied via the signal line L213 (the retrieve line is not illustrated), adds it to the CSR and sends them to the coherency status report sum-up unit 50 via the signal line L101-0 to -1.

3.8 Summing Up the Coherency Status Reports

The coherency status report sum-up unit 50, as described in section 3.4 of the mode 1, receives from the crossbar unit 40 via the signal line L450 the destination port number of the CSRs to be summed up and the memory port numbers to be used for suppressing data transfer. The unit 50 then stores the memory board port numbers in the MID field 528 of the CSR table 526 in the port summation circuits 525-0 to -1 specified by the destination port numbers, and stores the destination port numbers in the DIDQ 521-0 to -1. Next, as described in section 3.6 of the mode 3, the coherency status report sum-up unit 50 receives the CSR and the TXID from the processor boards 10-0 to -1 via the signal lines L101-0 to -1, and stores them in the CSR fields 529-0 to -1 and TXID field 527 that correspond to the input port of the CSR table 526 in the port summation circuit 525-0 to -1 specified by the DIDQ 521-0 to -1 corresponding to each input port. The enqueue and dequeue operations of the CSR table 526 are managed in-order and the summation and sending operations of CSSs are managed out-of-order. The summation circuit 530 checks all entries in the CSR table 526 and generates the CSS according to Table 4.

TABLE 4

| CSR | CSS |
| --- | --- |
| All are DONE | DONE |
| At least one is SHARED | SHARED |
| One is DIRTY | DIRTY |

The summation circuit 530 sends the generated CSS and the TXID in the TXID field 527 to the corresponding processor board 10-0 to -1 via the signal line L500-0 to -1. Based on the generated CSS, the summation circuit 530 generates, as in the mode 1, a suppress signal or a transfer allowance signal for the memory board 60-0 to -1, adds the TXID in the TXID field 527 to these signals, and issues a CSS via the signal line L530-0 to -1, arbitration/selector 531-532 and signal line L501 -0 to -1 to the memory board 60-0 to -1 specified by the MID field 528 of the entry for which the CSS has been generated. If the CSS is determined at a plurality of entries, for the nearest one to the head entry of the CSR table 526 the CSS is preferentially issued.

The summation circuit 530 checks whether all the CSR fields 529-0 to -1 at the head of the CSR entry 526 are valid or not and, if they are found valid, further checks if there is any improper combination of CSRs. The improper CSR combination means a combination such that there is a DIRTY CSR and other CSRs are other than DONE. When an improper CSR combination is found, the summation circuit 530 sends an ERR as the CSS to the corresponding processor board 10-0 to -1 via the signal line L500-0 to -1 and dequeues the corresponding entry. When an improper CSR combination does not exist, it simply dequeues the corresponding entry.

3.9 Issuing Data Transaction/Suppressing Data Transfer

Figure 8:
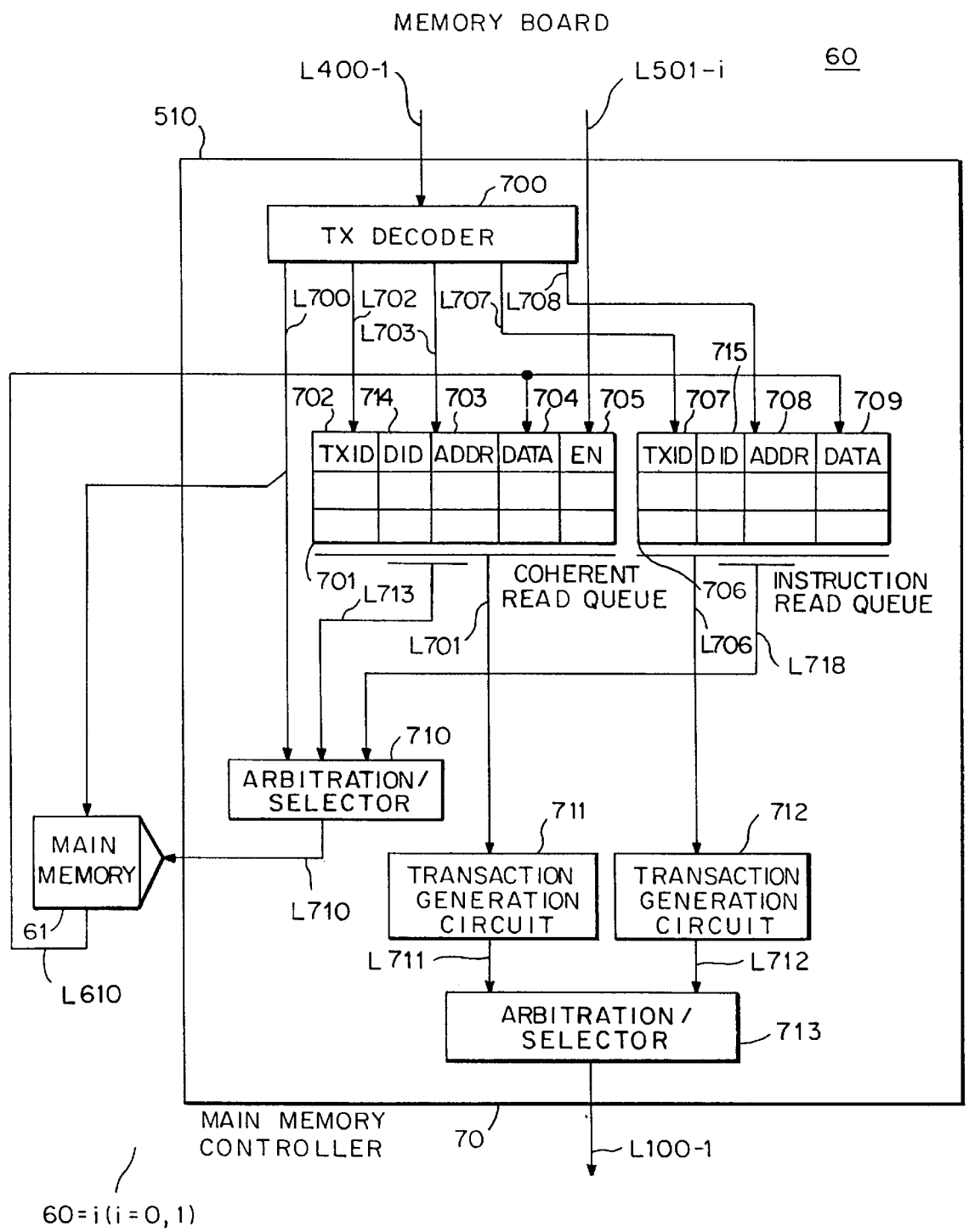
FIG. 8 is a block diagram of the memory board used in the system of FIG. 1.
Figure 9:
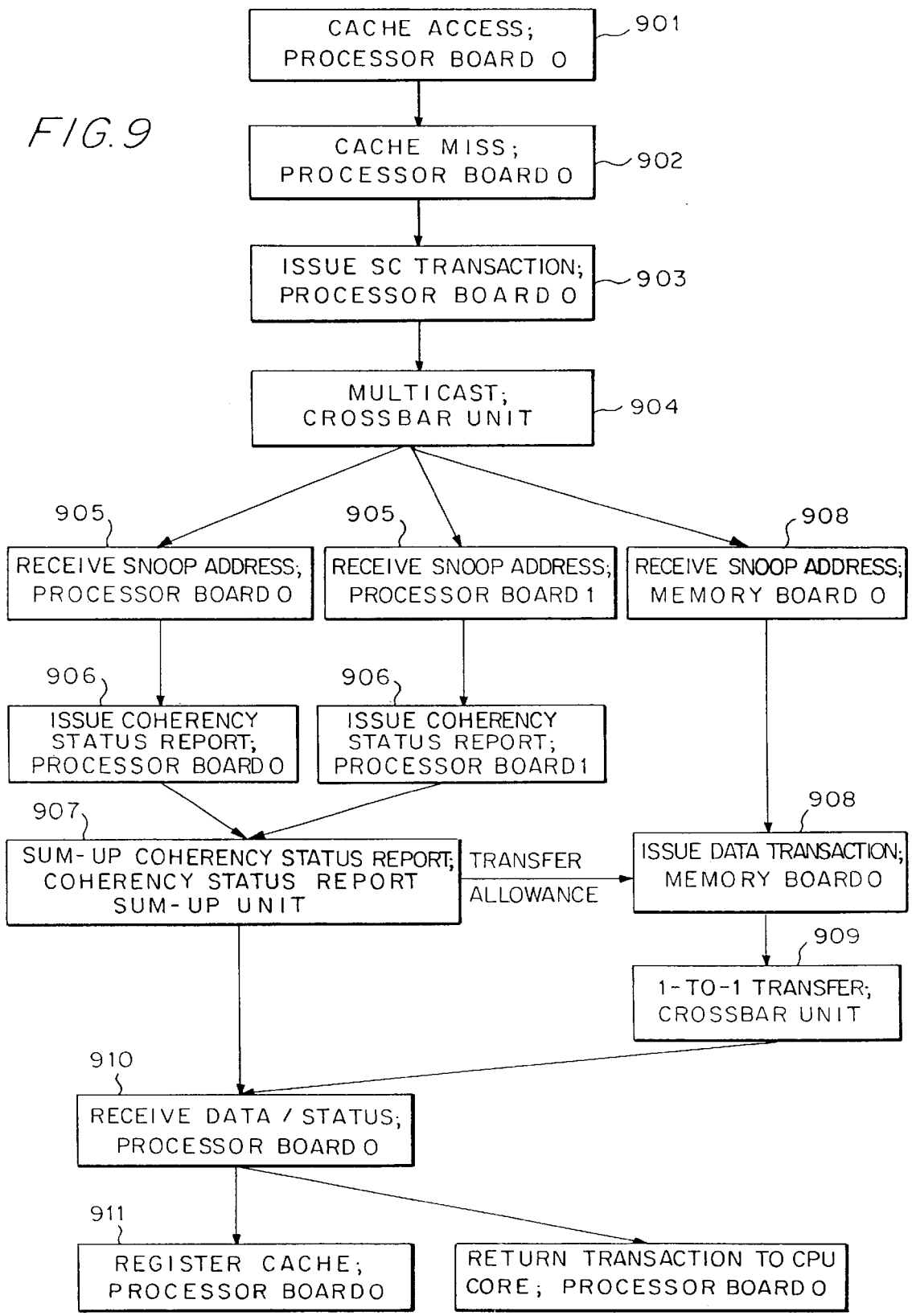
FIG. 9 is a coherency operation flowchart of operation case 1.

In the mode 1, the memory board 60-i (i=0,1), in FIG. 8, receives from the coherency status report sum-up unit 50 via the signal line L501-i (i=0,1) the transfer allowance signals or transfer suppress signals in the order of reception of the coherent read transactions. In this mode 3, on the other hand, the transfer allowance or transfer suppress signals arrive irrespective of the order in which the coherent read transactions arrived, but a TXID of the corresponding transaction is attached. Hence, the main memory controller 70, when it receives the transfer allowance or transfer suppress signal via the signal line L501-i (i=0,1), searches the coherent read queue 701 based on the attached TXID and stores the transfer allowance or transfer suppress signal in the EN field 705 of the entry having the same contents in the TXID field 702 as the attached TXID.

3.11 Receiving Data/Status

In the mode 1, the transaction receiving circuit 23 of FIG. 4 receives the CSSs from the coherency status report sum-up unit 50 via the signal line L500-i (i=0,1) in the order of reception of the coherent read transactions. In this mode 3, the CSSs arrive irrespective of the order in which the coherent read transactions are issued, but the TXID of the corresponding transaction is attached. Hence, the transaction receive circuit 23, when it receives the CSS via the signal line L500-i (i=0,1), searches the read data queue 230 based on the attached TXID and stores the CSS in the CSS field 234 of the entry having the same contents in the TXID field 231 as the attached TXID.

Further, in the mode 1 the contents of the read data queue 230 are sent, beginning with its head entry, to the cache access controller 21 via the signal line L230. In this mode 3 the DATA field 233 and the CSS field 234 become valid out-of-order, and thus the contents of the read data queue 230 are sent to the cache access controller 21 via the signal line L230, beginning with whichever entry has both the DATA field 233 and the CSS field 234.

Modification of Mode 3

(1) In the mode 3, when the CSRs are sent from the processor boards 10-0 to -1 to the coherency status report sum-up unit 50, the TXID is added to the CSRs. Because the crossbar unit 40 sends only the information obtained in the header cycle T0 to the coherency status report sum-up unit 50, the TXID in the address cycle T1 is sent from the processor board 10-0 to -1. In order to send the TXID, it is necessary to provide a dedicated signal line between the processor board 10-0 to -1 and the coherency status report sum-up unit 50 or send the CSS and TXID in a plurality of cycles. To avoid this, a method may be used in which the address cycle T1 in the MCDQ 409 in the ID send circuit 410 of the crossbar unit 40 (FIG. 6) is interpreted and the TXID T8 via the signal line L450 is transferred. In this case, the signal lines that needs to be added are limited to the one between the crossbar unit 40 and the coherency status report unit and thus an increase in the number of pins can be suppressed.

Mode 4 of the Invention (Bus Connection)

In the mode 1, the coherent read request, the data return and the inter-processor board transfer all transfer data by using the crossbar unit 40, "an interconnection network through which transactions can be sent in parallel." In this mode a case where the network is replaced with a bus will be described. In a computer system with two or more memory boards 60-0 to -1, this configuration offers an inexpensive multiprocessor system such that a plurality of coherent read requests can overlap with each other simultaneously.

(1) Configuration of the System

FIG. 15 illustrates an overall configuration of the computer system of mode 4. Unlike the mode 1 which uses the crossbar unit 40, in this mode 4, the processor boards 10-0 to -1 and the memory boards 60-0 to -1 are interconnected through a bus 31. Although the connection between the coherency status report sum-up unit 50 and the processor boards 10-0 to -1 or the memory boards 60-0 to -1 is similar to that of the mode 1, in the mode 4 the bus 31 and the coherency status report sum-up unit 50 are connected together through the signal line L310 whereas in the mode 1, the crossbar unit 40 and the coherency status report sum-up unit 50 are connected to each other.

FIG. 16 illustrates the internal configuration of the coherency status report sum-up unit 50 of this mode. Unlike the mode 1, the coherency status report sum-up unit 50 has a TX kind decoder 540 and a main memory port number generation circuit 550 to register the DIDQ 501 and MIDQ 502. In the processor board 10-0 to -1, the transaction sending circuit 22 (FIG. 3) no longer requires the header generation circuit 221, the main memory port number generation circuit 220 and the register 226 for holding the header cycle T0. These are not illustrated. Although the use of the bus 31 requires a bus arbiter, it is not illustrated and the description thereof will be omitted.

In the following, only points in which mode 4 differs from mode 1 in terms the processing of the coherent read request will be described and the description of the processing which is the same as those of mode 1 are omitted.

3.3 Issuing the System Connection Transaction

In comparison with the mode 1, in this mode 4, the operations associated with the generation of the header cycle T0 are unnecessary.

3.8 Summing up the Coherency Status Reports

This mode 4 differs from the mode 1 in the processing of storing the DIDQ 501 and MIDQ 502. In the mode 1, by using the information in the header cycle To sent to the crossbar unit 40, the crossbar unit 40 determines the port number to which to send the CSS and the port number of the memory board 60-0 to -1 to which to send the suppress signal, and sends these port numbers to the coherency status report sum-up unit 50. This mode 4 uses the bus instead of the crossbar unit 40, and therefore the header cycle T0 does not exist. This means that the above information needs to be obtained by using a part of the address cycle T1 on the bus.

When a transaction is sent out on the bus 31, the coherency status report sum-up unit 50 detects it and takes in the TX kind T5, the address T6 and the port number T7 in the address cycle T1 in the transaction via the signal line L310. The main memory port number generation circuit 550 retrieves the address T6 via the signal line L310 and, as in the processing of (3-C) of the mode 1, generates the port number of the memory board 60-0 to -1 from the address. The TX kind decoder decodes the TX kind T5 and, when it detects that the TX kind T5 is a coherent read request, i.e., a data read request or data read invalidation request, stores the port number in the DIDQ 501 via the signal line L310 and also stores the memory board port number obtained as described above in the MIDQ via the signal line L550.

The operations of summing up the CSRs and sending the suppress signal are similar to those of the mode 1.

In a multiprocessor system with a plurality of processor units and a plurality of memory units, according to this invention, CSRs can be summed up without limiting the number of coherent read requests that can be overlapped when the coherent read requests are executed simultaneously in an overlapping manner.

Further, in a multiprocessor system in which a plurality of processor units and a plurality of memory units are interconnected through an interconnection network through which addresses and data can be transferred parallelly, when a plurality of coherent read requests are executed simultaneously in an overlapping manner, the coherency status reports can be summed up without limiting the number of overlappable coherent read requests. Further, with this invention, the number of pins between the processor unit and the mechanism that sums up the coherency status reports can be minimized.

The present invention can be implemented by providing only the interconnection apparatus 30 which is then installed by the user into a multiprocessor system which includes a plurality of processor units 10 each having a processor 11 and a cache memory 12, and a plurality of memory units 60 shared by processor units 10. The interconnection apparatus 30 includes an interconnection network 40, to be connected to the processor units 10 and the memory units 60, for exchanging data between the processor units 10 and the memory units 60 and a cache status report sum up circuit 50 which sums up information indicating a result of a cache coherency check received from each processor unit 10 and which sends the summed up cache coherency results to a processor unit 10 which issued the memory access request requiring the cache coherency check.

The present invention can also be implemented by providing a chip set including a plurality of semiconductor integrated circuit chips for performing cache coherency processings. The chip set can be installed by the user in a multiprocessor system which includes a plurality of processor units 10, each including a processor 11 and a cache memory 12, and a plurality of memory units 60 shared by the processor units 10. The chip set includes an interconnection network unit 40 connected to the processor units 10 and the memory units 60 for exchanging data between the processor units 10 and the memory units 60, a cache status reporting unit 20, responsive to a coherent read request issued from the interconnection network unit 40 based on a memory access request requiring a cache coherency check, for sending a cache coherency check result to the interconnection network unit 40 indicating a status of a corresponding cache memory 12, a cache status report sum up unit 50 which sums up cache coherency check results received from the cache status reporting unit 20 corresponding to each processor unit 10 and which sends the summed up cache coherency check results to the processor unit 10 which issued the memory access request requiring the cache coherency check, and a memory controller unit 70 which controls access to a corresponding memory unit 60 based on the memory access request requiring a cache coherency check.

While the present invention has been described in detail and pictorially in the accompanying drawings, it is not limited to such details since many changes and modification recognizable to these of ordinary skill in the art may be made to the invention without departing from the spirit and scope of the invention, and all such modifications as would be obvious to one skilled in the art are intended to be included within the scope of the following claims.

We claim:

1. A multiprocessor system comprising:
   a plurality of processor units each having at least one processor and at least one cache memory provided corresponding to said processor;
   at least one memory unit providing a shared memory area shared by said processor units; and
   an interconnection apparatus which interconnects said processor units and said at least one memory unit, said interconnection apparatus retrieves cache status reports from respective ones of said processor units in response to a memory access request requiring a cache coherency check issued by either one of said processor units, each of said cache status reports indicating caching status of a corresponding one of said processor units as to a caching line in said shared memory area which is an object of said cache coherency check, sums up said cache status reports into a cache status summary which indicates a total caching status of said processor units as to said caching line, and transfers said cache status summary to said one of said processor units which issued said memory access request.

2. A multiprocessor system according to claim 1, wherein said interconnection apparatus includes an interconnection network which exchanges data between said processor units and said memory units.

3. A multiprocessor system according to claim 2, wherein said interconnection apparatus parallelly processes memory access requests requiring cache coherency checks from said processor units.

4. A multiprocessor system according to claim 2, wherein said interconnection apparatus comprises:
   a plurality of data lines for exchanging data between said processor units and said memory units; and
   a plurality of status report lines for reporting information concerning the status of the cache memories to said processor units.

5. A multiprocessor system according to claim 2, wherein said interconnection apparatus comprises:
   a plurality of request lines for use by said processor units for requesting information on the status of said cache memories; and
   a plurality of report lines for use by said interconnection apparatus for reporting the status of the cache memories to the processor unit.

6. A multiprocessor according to claim 1, wherein each processor unit comprises:
   a cache status reporting circuit, responsive to a coherent read request issued by said interconnection apparatus based on the memory access request requiring a cache coherency check, for sending a cache coherency check result to said interconnection apparatus according to the status of the cache memory.

7. A multiprocessor system according to claim 6, wherein said interconnection apparatus comprises:
   a cache status report sum up circuit which sums up the cache coherency check results received from the cache status reporting circuit in each processor unit, and sends the summed up cache coherency check results to the processor unit which issued the memory access request requiring the cache coherency check; and
   an interconnecting network connected to said processor units and said memory units for exchanging data between said processor units and said memory units.

8. A multiprocessor system according to claim 7, wherein said interconnection apparatus comprises:
   a register which stores information indicating a processor unit which issued the memory access request requiring the cache coherency check,
   wherein said interconnection apparatus sends the information generated by the cache status report sum up circuit to the processor unit indicated by the information stored in said register.

9. A multiprocessor system according to claim 8, wherein said interconnection apparatus parallelly processes memory access requests requiring cache coherency checks from said processor units.

10. A multiprocessor system according to claim 8, wherein said interconnection apparatus comprises:
    a plurality of data lines for exchanging data between said processor units and said memory units; and
    a plurality of status report lines for reporting information concerning the status of the cache memories to said processor units.

11. A multiprocessor system according to claim 8, wherein said interconnection apparatus comprises:
    a plurality of request lines for use by said processor units for requesting information on the status of said cache memories; and
    a plurality of report lines for use by said interconnection apparatus for reporting the status of the cache memories to the processor unit.

12. A multiprocessor system according to claim 1, wherein said interconnection apparatus parallelly processes memory access requests requiring cache coherency checks from said processor units.

13. A multiprocessor system according to claim 1, wherein said interconnection apparatus comprises:
    a plurality of data lines for exchanging data between said processor units and said memory units; and
    a plurality of status report lines for reporting information concerning the status of the cache memories to said processor units.

14. A multiprocessor system according to claim 1, wherein said interconnection apparatus comprises:
    a plurality of request lines for use by said processor units for requesting information on the status of said cache memories; and a plurality of report lines for use by said interconnection apparatus for reporting the status of the cache memories to the processor unit.

15. A multiprocessor system according to claim 1, wherein said interconnection apparatus further comprises:
    an arbitrator which arbitrates a plurality of memory access requests requiring cache coherent checks each being issued by either ones of said processor units; and
    sending means for sending successively the memory access requests to respective ones of said processor units in an order in which said arbitrator arbitrates.

16. An interconnection apparatus for use in a multiprocessor system including a plurality of processor units each having at least one processor and at least one cache memory provided corresponding to said processor, and at least one memory unit providing a shared memory area shared by said processor units, said interconnection apparatus comprising:
    an interconnection network connected to said processor units and said at least one memory unit for exchanging data between said processor units and said at least one memory unit; and
    a cache status report sum up circuit which retrieves cache status reports from respective ones of said processor units in response to a memory access request requiring a cache coherency check issued by either of said processor units, each of said cache status reports indicating caching status of a corresponding one of said processor units as to a caching line in said shared memory area which is an object of said cache coherency check, sums up said cache status reports into a cache status summary which indicates a total caching status of said processor units as to said caching line, and transfers said cache status summary to said one of said processor units which issued said memory access request.

17. An interconnection apparatus according to claim 16 further comprising:
    a register which stores information indicating a processor unit which issued the memory access request requiring the cache coherency check,
    wherein said information generated by the cache status report sum up circuit is sent to the processor unit indicated by the information stored in said register.

18. An interconnection apparatus according to claim 16, wherein said interconnection apparatus parallelly processes memory access requests requiring cache coherency checks from said processor units.

19. A chip set including a plurality of semiconductor integrated circuit chips for performing cache coherency processings in a multiprocessor system including a plurality of processor units each having at least one processor and at least one cache memory, and at least one memory unit providing a shared memory area shared by the processor units, said chip set comprising:
    an interconnection network unit connected to said processor units and said at least one memory unit for exchanging data between said processor units and said at least one memory unit;
    a cache status reporting unit, responsive to a coherent read request issued from said interconnection network unit based on a memory access request requiring a cache coherency check, for sending a cache coherency check result to said interconnection network unit indicating a status of a corresponding cache memory;
    a cache status report sum up unit which retrieves cache status reports from respective ones of said processor units in response to a memory access request requiring a cache coherency check issued by either of said processor units, each of said cache status reports indicating caching status of a corresponding one of said processor units as to a caching line in said shared memory area which is an object of said cache coherency check, sums up said cache status reports into a cache status summary which indicates a total caching status of said processor units as to said caching line, and transfers said cache status summary to said one of said processor units which issued said memory access request; and
    a memory controller unit which controls access to said at least one memory unit based on the memory access request requiring a cache coherency check.

20. A chip set according to claim 19 wherein said cache status report sum up unit comprises:
    a register which stores information indicating a processing unit which issued the memory access request requiring the cache coherency check,
    wherein said cache status report sum up unit sends the summed up cache coherency check result to the processor unit indicated by the information stored in said register.

21. A chip set according to claim 19, wherein said interconnection network unit parallelly processes memory access requests requiring cache coherency checks from said processor units.

22. A multiprocessor system, comprising:
    a plurality of processor units each having at least one processor and at least one cache memory;
    at least one memory unit providing a shared memory area shared by the processor units;
    a first interconnection network for interconnecting said processor units and said at least one memory unit;
    a second interconnection network for interconnecting said processor units; and
    a plurality of signal lines for connecting said first interconnection network and said second interconnecting network, wherein said second interconnection network includes a cache status report sum up circuit which retrieves cache status reports from respective ones of said processor units in response to a memory access request requiring a cache coherency check issued by either of said processor units, each of said cache status reports indicating caching status of a corresponding one of said processor units as to a caching line in said shared memory area which is an object of said cache coherency check, sums up said cache status reports into a cache status summary which indicates a total caching status of said processor units as to said caching line, and transfers said cache status summary to said one of said processor units which issued said memory access request.

23. A multiprocessor system according to claim 22, wherein one of said first interconnection network and said second interconnection network is mounted on an integrated circuit.

24. A multiprocessor system according to claim 22, wherein at least one of said processor units or at least one of said memory units can be detachably mounted independently of said first interconnection network or said second interconnection network.

25. A multiprocessor system, comprising:
    a plurality of processor units each having at least one processor;

at least one memory unit providing a shared memory area shared by said processor units;

a first interconnection network for sending at least one of addresses and data between said processor units and said least one memory unit; and a second interconnection network for interconnecting said processor units, wherein each processor unit includes at least one cache memory provided corresponding to said processor unit and cache status reporting means which, in response to a memory access request, as to a cache line in said shared memory area, requiring a cache coherency check received through said first interconnection network, sends a cache status report indicating caching status of said processor unit as to said cache line to said second interconnection network; and wherein said second interconnection network includes cache status report sum up means which sums up the cache status reports respectively received from said processor units into a cache status summary indicating a total caching status of said processors as to said cache line, and means for sending the cache status summary to a source which issued the memory access request requiring the cache coherency check.

26. A multiprocessor system according to claim 25, further comprising:

storing means, connected between said first interconnection network and said second interconnection network, for storing information indicating the source which issued the memory access request requiring the cache coherency check, wherein said second interconnection network sends the information generated by the cache status report sum up means to one of the processor unit specified by said storing means.

27. A multiprocessor system according to claim 26, wherein said first interconnection network comprises:

means for parallelly sending at least one of the addresses and at least one of the addresses and data to the processor units, or to one of the memory units.

28. A multiprocessor system according to claim 27, wherein the first interconnection network comprising:

means for sending transactions for performing successive memory access requests each requiring the cache coherency check to said processor units and to said at least one memory unit, wherein the order in which respective ones of said processor units and said at least one memory unit receives successive transactions corresponds to an order in which respective sources of said successive memory access requests are stored in said storing means.

29. A multiprocessor system according to claim 26, wherein said first interconnection network comprising:

means for sending transactions for performing successive memory access requests each requiring the cache coherency check to said processor units and to said at least one memory unit, wherein the order in which respective ones of said processor units and said at least one memory unit receives successive transactions agrees to an order in which respective sources of said successive memory corresponds requests are stored in said storing means.

30. A multiprocessor system according to claim 26, wherein each processor unit sends the status of the cache memory to said second interconnection network in the order in which they receive the memory access requests requiring the cache coherency check; and wherein said second interconnection network sends information indicating the status of the cache memory of the memory access request issuing source to one of the processor units specified by said storing means in the same order in which the memory access request issuing sources are identified.

31. A multiprocessor system according to claim 25, wherein said first interconnection network comprises:

means for parallelly sending at least one of the addresses and at least one of the addresses and data to the processor units, or to one of the memory units.

32. A multiprocessor system according to claim 25, wherein the second interconnection network comprises:

means for identifying which of said processor units are connected to the networks as part of the multiprocessor system, wherein said cache coherency report sum up means uses said identifying means to generate information determining the status of the cache memory of a source which issued the memory access request requiring the cache coherency check.

33. A multiprocessor system according to claim 32, wherein said identifying means is set by presence signals sent from said processor units when the multiprocessor is started.

34. A multiprocessor system according to claim 25, wherein each processor unit comprises:

a plurality of said processors;

a plurality of said cache memories; and identifying means for identifying which of said processor units are connected to said networks, wherein said cache status reporting means comprises:

means for summing up the cache coherency check results of said cache memories based on the statuses of said cache memories and sending the summary to said second interconnection network, wherein said processor units, in response to the memory access request requiring the cache coherency check, sends cache coherency check results of said cache memories based on the statuses of said cache memories to said cache status reporting means; and wherein said cache status reporting means generates cache coherency check results of said processor units by using the cache coherency check results of said cache memories and information concerning said processor units identified by said identifying means.

35. A multiprocessor system according to claim 25, wherein said first interconnection network is a shared bus.

36. A multiprocessor system according to claim 25, wherein at least one of said processor units or at least one of said memory units can be detachably mounted independently of said first interconnection network or said second interconnection network.

37. A method of processing cache coherency checks in a multiprocessor system including a plurality of processor units each having at least one processor and at least one cache memory, and at least one memory unit providing a shared memory area shared by said processor units, said method comprising the steps of:

exchanging data between said processor units and said at least one memory unit;

retrieving cache status reports from respective ones of said processor units in response to a memory access request requiring a cache coherency check issued by either of said processor units wherein each of said cache status reports indicates caching status of a corresponding one of said processor units as to a caching line in said shared memory area which is an object of said cache coherency check;

summing up said cache status report into a cache status summary which indicates a total caching status of said processor units as to said caching lines; and transferring said cache status summary to said one of said processor units which issued said memory access request.

38. A method according to claim 37, further comprising the steps of:

storing information indicating a processor unit which issued the memory access request requiring the cache coherency check; and sending the summed up cache coherency results to the processor unit indicated by the information stored by said storing step.

39. A method according to claim 37, further comprising the step of:

parallelly processing memory access requests requiring cache coherency checks.

40. A multiprocessor system comprising:

a plurality of processor units each having a processor;

a plurality of memory units shared by the processor units;

a first interconnection network for sending at least one of addresses and data between the processor units and the memory units; and a second interconnection network for interconnecting the processor units, wherein each processor unit includes a cache memory and cache status reporting means which, in response to a memory access request requiring a cache coherency check received through the first interconnection network, sends a cache coherency check result to the second interconnection network according to the status of the cache memory, wherein said second interconnection network includes cache status report sum up means which sums up the cache status reports received from the processor units, and generates information indicating the statuses of the cache memories of and means for sending the information to a source which issued the memory access request requiring the cache coherency check, wherein said processor units include means for sending latest data to the source which issued the memory access request requiring the cache coherency check in response to the memory access request requiring the cache coherency check, wherein said memory units include means for suppressing the operation of sending data held by said memory units to the source that has issued the memory access request requiring the cache coherency check in response to the memory access request, and wherein said second interconnection network includes means which, according to information indicating the status of the cache memory of the source which issued the memory access request requiring the cache coherency check, informs one of said memory units of the suppression of data transfer to said processor units.

41. A multiprocessor system comprising:

a plurality of processor units each having a processor;

a plurality of memory units shared by the processor units;

a first interconnection network for sending at least one of addresses and data between the processor units and the memory units; and a second interconnection network for interconnecting the processor units, wherein each processor unit includes a cache memory and cache status reporting means which, in response to a memory access request requiring a cache coherency check received through the first interconnection network, sends a cache coherency check result to the second interconnection network according to the status of the cache memory, and wherein said second interconnection network includes cache status report sum up means which sums up the cache status reports received from the processor units, and generates information indicating the statuses of the cache memories of and means for sending the information to a source which issued the memory access request requiring the cache coherency check, and wherein said processor units includes means which, in response to the memory access request requiring the cache coherency check, sends latest data to the source which issued the memory access request requiring the cache coherency check, and means which, according to information supplied from said second interconnection network indicating the status of the cache memory of the source which issued the memory access request requiring the cache coherency check, selects latest data sent from said processor units and data sent form said memory units.

42. A multiprocessor system comprising:

a plurality of processor units each having a processor;

a plurality of memory units shared by the processor units;

a first interconnection network for sending at least one of addresses and data between the processor units and the memory units; and a second interconnection network for interconnecting the processor units, wherein each processor unit includes a cache memory and cache status reporting means which, in response to a memory access request requiring a cache coherency check received through the first interconnection network, sends a cache coherency check result to the second interconnection network according to the status of the cache memory, wherein said second interconnection network includes cache status report sum up means which sums up the cache status reports received from the processor units, and generates information indicating the statuses of the cache memories of and means for sending the information to a source which issued the memory access request requiring the cache coherency check, wherein said second interconnection network includes means for reporting an internal busy status to said first interconnection network, and wherein said first interconnection network includes means which, according to the busy status of the second interconnection network, suppresses the sending of the memory access request requiring the cache coherency check to the processor units and the memory units.

43. A multiprocessor system comprising:

a plurality of processor units each having a processor;

a plurality of memory units shared by the processor units;

a first interconnection network for sending at least one of addresses and data between the processor units and the memory units; and a second interconnection network for interconnecting the processor units, wherein each processor unit includes a cache memory and cache status reporting means which, in response to a memory access request requiring a cache coherency check received through the first interconnection network, sends a cache coherency check result to the second interconnection network according to the status of the cache memory, wherein said second interconnection network includes cache status report sum up means which sums up the cache status reports received from the processor units, and generates information indicating the statuses of the cache memories of and means for sending the information to a source which issued the memory access request requiring the cache coherency check, and wherein said second interconnection includes means which, when generating information indicating the status of the cache memory of the source which issued the memory access request requiring the cache coherency check, checks whether the consistency of the cache status is guaranteed and, if the cache status consistency is found not guaranteed, sends an error report to one of the processor units.

44. A multiprocessor system comprising:

a plurality of processor units each having a processor:

a plurality of memory units shared by the processor units;

a first interconnection network for sending at least one of addresses and data between the processor units and the memory units;

a second interconnection network for interconnecting the processor units, wherein each processor unit includes a cache memory and cache status reporting means which, in response to a memory access request requiring a cache coherency check received through the first interconnection network, sends a cache coherency check result to the second interconnection network according to the status of the cache memory, and wherein said second interconnection network includes cache status report sum up means which sums up the cache status reports received from the processor units, and generates information indicating the statuses of the cache memories of and means for sending the information to a source which issued the memory access request requiring the cache coherency check; and storing means, connected between said first interconnection network and said second interconnection network, for storing information indicating the source which issued the memory access request requiring the cache coherency check, wherein said second interconnection network sends the information generated by the cache status report sum up means to one of the processor unit specified by said storing means, and wherein said second interconnection network includes means which sends an error signal to one of the processor units when said one processor unit receives the cache memory statuses from said processor units before said storing means specifies one of the processor units.

45. A multiprocessor system according to claim 25, wherein one of said first interconnection network and said second interconnection network is mounted on an integrated circuit.

* * * * *